(12) United States Patent
Liu

(10) Patent No.: US 11,030,471 B2
(45) Date of Patent: Jun. 8, 2021

(54) TEXT DETECTION METHOD, STORAGE MEDIUM, AND COMPUTER DEVICE

(71) Applicant: Tencent Technology (Shenzhen) Company Limited, Shenzhen (CN)

(72) Inventor: Ming Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 92 days.

(21) Appl. No.: 16/572,171

(22) Filed: Sep. 16, 2019

(65) Prior Publication Data

US 2020/0012876 A1 Jan. 9, 2020

Related U.S. Application Data

(63) Continuation of application No. PCT/CN2018/107032, filed on Sep. 21, 2018.

(30) Foreign Application Priority Data

Sep. 25, 2017 (CN) .......................... 201710874973.1

(51) Int. Cl.
*G06K 9/20* (2006.01)
*G06K 9/46* (2006.01)
(Continued)

(52) U.S. Cl.
CPC .......... *G06K 9/2054* (2013.01); *G06K 9/4604* (2013.01); *G06K 9/6218* (2013.01); *G06K 9/6256* (2013.01); *G06N 3/08* (2013.01)

(58) Field of Classification Search
CPC combination set(s) only.
See application file for complete search history.

(56) References Cited

U.S. PATENT DOCUMENTS 5,555,317 A * 9/1996 Anderson ............ G06K 9/6256
382/159
7,164,797 B2 * 1/2007 Simard ................ G06K 9/6202
382/218
(Continued)

FOREIGN PATENT DOCUMENTS

CN 105868758 A 8/2016
CN 106384112 A 2/2017
(Continued)

OTHER PUBLICATIONS

International Search Report and translation for corresponding application PCT/CN2018/107032 filed on Sep. 21, 2018, dated Dec. 11, 2018, 9 pages.
(Continued)

*Primary Examiner* — Tsung Yin Tsai
(74) *Attorney, Agent, or Firm* — Brinks Gilson & Lione

(57) ABSTRACT

This application provides a text detection method, including: obtaining, by a computer device, an image; inputting the image into a neural network, and outputting a target feature matrix; inputting the target feature matrix into a fully connected layer, the fully connected layer mapping each element of the target feature matrix to a predicated subregion corresponding to the image according to a preset anchor; and obtaining text feature information of the predicated subregion, connecting the predicated subregion into a corresponding predicted text line according to the text feature information of the predicated subregion by using a text clustering algorithm, and determining a text area corresponding to the image.

17 Claims, 14 Drawing Sheets

(51) Int. Cl.
*G06K 9/62* (2006.01)
*G06N 3/08* (2006.01)

(56) References Cited

U.S. PATENT DOCUMENTS

| | | | |
|---|---|---|---|
| 7,174,044 B2* | 2/2007 | Ding | G06K 9/4609 |
| | | | 382/210 |
| 9,053,431 B1* | 6/2015 | Commons | G06N 3/08 |
| 9,349,062 B2* | 5/2016 | Mei | G06K 9/18 |
| 10,430,649 B2* | 10/2019 | Pao | G06K 9/00456 |
| 10,896,349 B2* | 1/2021 | Wen | G06K 9/342 |
| 2006/0222239 A1* | 10/2006 | Bargeron | G06K 9/6256 |
| | | | 382/159 |
| 2014/0270526 A1* | 9/2014 | Wu | G06K 9/348 |
| | | | 382/177 |
| 2014/0270528 A1* | 9/2014 | Ramos | G06T 7/73 |
| | | | 382/182 |
| 2015/0063688 A1* | 3/2015 | Bhardwaj | G06K 9/3258 |
| | | | 382/159 |
| 2016/0104058 A1* | 4/2016 | He | G06K 9/66 |
| | | | 382/156 |
| 2017/0004374 A1* | 1/2017 | Osindero | G06K 9/325 |
| 2017/0011279 A1* | 1/2017 | Soldevila | G06N 3/04 |
| 2018/0025256 A1* | 1/2018 | Bai | G06N 3/04 |
| | | | 382/229 |

FOREIGN PATENT DOCUMENTS

| | | |
|---|---|---|
| CN | 106570497 A | 4/2017 |
| CN | 106897732 A | 6/2017 |
| CN | 108304761 A | 7/2018 |

OTHER PUBLICATIONS

Chinese Office Action and concise translation regarding 201710874973.1 dated Apr. 27, 2021, 11 pages.
Tian et al., "Detecting Text in Natural Image with Connectionist Text Proposal Network," 14$^{th}$ European Conference Computer Vision (ECCV), Oct. 16, 2016, 17 pages.

* cited by examiner

TEXT DETECTION METHOD, STORAGE MEDIUM, AND COMPUTER DEVICE

RELATED APPLICATION

This application a continuation application of PCT Patent Application No. PCT/CN2018/107032, filed on Sep. 21, 2018, which claims priority to Chinese Patent Application No. 201710874973.1, filed with the China National Intellectual Property Administration on Sep. 25, 2017, both of which are incorporated herein by reference in their entireties.

FIELD OF THE TECHNOLOGY

This application relates to the field of computer technologies, and in particular, to a text detection method, a storage medium, and a computer device.

BACKGROUND OF THE DISCLOSURE

To meet some application requirements, a target object in an image needs to be detected. Because a usual object has a complete closed boundary, in a common target object detection method, a candidate area in which the target object is located is directly predicted, and a category of the object can be derived according to some features of the target object in the predicted candidate area, to implement detection on the target object.

Text is different from other usual objects. The boundary of text changes with the stroke, and there may be spaces between characters and/or words of the text. It is difficult to determine a type of text according to a part of the text. Therefore, when a conventional target object detection algorithm is used, text spaces and the category of the entire text may not be predicted accurately according to some text in the predicted candidate area, leading to incorrect detection and missed detection. Consequently, the text positioning accuracy is not high, and the detection robustness is relatively low.

The present disclosure described a method, device, storage medium for performing test detection, addressing at least one of the above drawbacks.

SUMMARY

According to embodiments provided in this application, a text detection method, a storage medium, and a computer device are provided.

The present disclosure describes an embodiment of a method for performing text detection. The method includes obtaining, by a computer device, an image. The computer device includes a memory storing instructions and a processor in communication with the memory. The method includes inputting, by the computer device, the image into a neural network to obtain a target feature matrix. The method includes inputting, by the computer device, the target feature matrix into a fully connected layer to map each element of the target feature matrix to a predicted subregion according to a preset anchor. The method includes obtaining, by the computer device, text feature information of the predicted subregion. The method includes connecting the predicated subregion into a predicted text line according to the text feature information of the predicated subregion by using a text clustering algorithm; and determining a text area corresponding to the image based on the predicted text line.

The present disclosure describes an embodiment of a computer device. The computer device includes a memory and a processor in communication with the memory. The memory storing an instruction. The instruction, when executed by the processor, is configured to cause the processor to perform obtaining an image and inputting the image into a neural network to obtain a target feature matrix. The instruction, when executed by the processor, is configured to cause the processor to perform inputting the target feature matrix into a fully connected layer to map each element of the target feature matrix to a predicated subregion according to a preset anchor. The instruction, when executed by the processor, is configured to cause the processor to perform obtaining text feature information of the predicated subregion. The instruction, when executed by the processor, is configured to cause the processor to perform connecting the predicated subregion into a predicted text line according to the text feature information of the predicated subregion by using a text clustering algorithm; and determining a text area corresponding to the image based on the predicted text line.

The present disclosure describes an embodiment of a non-transitory computer readable storage medium. The non-transitory computer readable storage medium stores instructions. The instructions, when executed by a processor, are configured to cause the processor to obtain an image; and input the image into a neural network to obtain a target feature matrix. The instructions, when executed by the processor, are configured to cause the processor to input the target feature matrix into a fully connected layer to map each element of the target feature matrix to a predicted subregion according to a preset anchor. The instructions, when executed by the processor, are configured to cause the processor to obtain text feature information of the predicated subregion. The instructions, when executed by the processor, are configured to cause the processor to connect the predicated subregion into a predicted text line according to the text feature information of the predicated subregion by using a text clustering algorithm; and determine a text area corresponding to the image based on the predicted text line.

The details of one or more embodiments of this application are disclosed in the following accompanying drawings and description. Other features, objectives, and advantages of this application become clearer from the specification, the accompanying drawings, and the claims.

BRIEF DESCRIPTION OF THE DRAWINGS

To describe the technical solutions in the embodiments of this application more clearly, the following briefly describes the accompanying drawings required for describing the embodiments. Apparently, the accompanying drawings in the following description show merely some embodiments of this application, and a person of ordinary skill in the art may still derive other drawings from these accompanying drawings without creative efforts.

DESCRIPTION OF EMBODIMENTS

To make the objectives, the technical solutions, and the advantages of this application clearer, the following further describes this application in detail with reference to the accompanying drawings and the embodiments. It should be understood that the specific embodiments described herein are only used to describe this application, instead of limiting this application.

It may be understood that the terms "first", "second" and the like used in this application may be used for describing various elements in this specification. However, the elements are not limited by the terms unless otherwise specified. The terms are only used for distinguishing one element from another element.

The text detection method in this embodiment of this application may be applied to a computer device. The computer device may be an independent physical server or terminal, may be a server cluster including a plurality of physical servers, or may be a cloud server providing basic cloud computing services such as a cloud server, a cloud database, cloud storage and a content delivery network (CDN). The terminal may be a smartphone, a tablet computer, a notebook computer, a desktop computer, a smart speaker, a smartwatch, or the like, but is not limited thereto. The display screen of the terminal may be a liquid crystal display screen, an e-ink display screen, or the like. The input apparatus of the computer device may be a touch layer covering the display screen, or may be a button, a trackball, or a touchpad disposed on a housing of the computer device, or may be an external keyboard, touchpad, or mouse or the like. The touch layer and the display screen form a touch screen.

Figure 1:
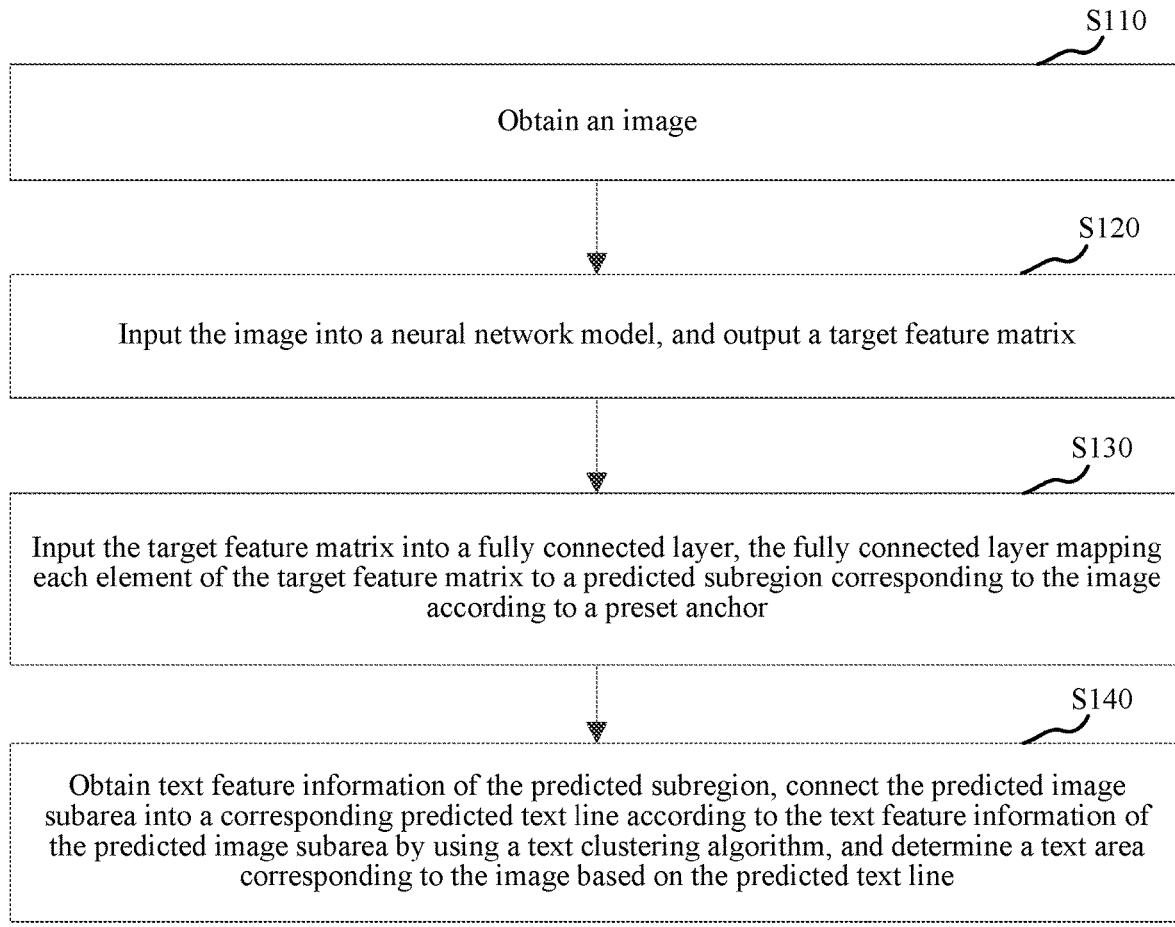
FIG. 1 is a flowchart of a text detection method in an embodiment.

As shown in FIG. 1, in an embodiment, a text detection method is provided and includes the following content:

Step S110: Obtain an image. The image may include a to-be-detected image.

Specifically, the to-be-detected image refers to an image on which text detection is to be performed. The method is configured to detect whether the image includes a text area, and/or to determine a location of the text area. The image may be images of various types such as a driver's license, a credit card, a bank card, an identity card, a contact card, an advertisement picture, and a video screenshot. A text scale in the image may be any scale.

Step S120: Input the image into a neural network, and output a target feature matrix. The neural network may include a neural network model.

Specifically, the image may be input into a neural network for feature extraction, and corresponding convolution is performed on extracted features to obtain a corresponding target feature matrix. A feature matrix may include a feature map. The target feature matrix may include a target feature map. Further, the neural network model may alternatively be used as a feature extractor in advance to perform feature extraction on the image, and then the extracted features are input into different neural network models to output a target feature matrix. For example, feature extraction is performed on a to-be-processed image by using a residual network. The number of layers of the residual network may be arbitrarily set according to needs, and usually, an increased number of layers indicates more extracted image features. Feature extraction may also be performed on the image by using other network structures, such as VGG19, Res50, and ResNet101. The extracted features are input into a memory network model for processing to output the target feature matrix.

The scale of the input image may change, and a feature dimension obtained by performing feature extraction on the image may also change accordingly. The target feature matrix may also be considered as a sequence representing an image eigenvalue.

Step S130: Input the target feature matrix into a fully connected layer, the fully connected layer mapping each element of the target feature matrix to a predicted subregion corresponding to the image according to a preset anchor. The predicted subregion may include a predicted image subarea. The preset anchor may include a preset anchor area.

The fully connected layer may refer to a convolutional layer including a convolution operation. The fully connected layer may implement a function of a "classifier" in a convolutional neural network, and may map features to a sample space. An anchor may determine a mapping range of an original image, and may indicate an area of concern of a detection model. By performing a plurality of scale and aspect ratio transformations on the anchor, detection on text of a plurality of scales and aspect ratios can be implemented. In an embodiment, a width of the preset anchor may be a fixed value. By setting the width of the anchor to the fixed value, detection on the image may be implemented in an area range of a preset width, and a text change in a horizontal direction within a relatively small range is relatively small, so that the text detection accuracy may be improved. A height value of the preset anchor may change. For example, the height value may be set to 7, 11, 18, 25, 35, 56, 67, 88, 100, 168, 278, or the like. By using the changing height value, various shapes in an actual scenario may be covered to the greatest extent by using the anchor.

Specifically, the fully connected layer may map features corresponding to the elements of the target feature matrix to the image according to the preset anchor, to obtain a corresponding image subarea (or subregion) of each feature in the image. Further, when the width value of the anchor is fixed, the width of the image subarea that corresponds to the feature mapped to the original image is fixed, and location information of each image subarea can be determined only by performing prediction on the width of the image subarea. When the width of the preset anchor is fixed, only the height value of the image subarea needs to be predicted, to reduce a search space of model optimization.

Further, each element of the target feature matrix is mapped back to the original image to obtain the corresponding image subarea (or subregion). Text detection is performed on each image subarea to implement segmentation on the image. One original image is segmented into a plurality of image subareas for text detection.

Step S140: Obtain text feature information of the predicted image subarea (or subregion), connect the predicted image subarea into a predicted text line according to the text feature information of the predicted image subarea by using a text clustering algorithm, and determine a text area corresponding to the image based on the predicted text line.

The text feature information refers to information that reflects text attributes. The text attributes include a text location information and text confidence information in an image. Predicting the text feature information of the predicted image subarea includes predicting the text location information and the text confidence of the predicted image subarea. The text location information may be determined by predicting a 2K vertical coordinate offset and a 1K text line horizontal boundary offset. K is the preset number of anchors, and may change or be preset according to needs. After training, when performing text detection on the image, the text detection model can provide a predicted vertical direction offset corresponding to each predicted image subarea, and can obtain, according to a regression equation, an actual vertical direction offset and height value corresponding to each predicted image subarea according to the vertical direction offset obtained by prediction by the text detection model, to determine text location information of each predicted image subarea. The text confidence refers to a probability that content in the predicted image subarea (or subregion) includes text. The text clustering algorithm refers to an algorithm or a predefined rule that can connect image subareas into a corresponding text line. For example, when a picture of an identity card is input, coordinates of an upper left corner and a lower right corner and confidence of each character in the identity card can be obtained.

Specifically, according to the text location information and the text confidence that correspond to the predicted image subarea, image subareas located in a same text line are obtained according to a rule for connection. A plurality of image subareas is connected into a corresponding text line. By connecting individual image subareas into the corresponding text line, the text area corresponding to the image can be determined on the whole in units of lines, to prevent misdetection caused by spaces existing in the text extracted at an image subarea location.

In this embodiment, the image is input into the neural network model, to obtain the target feature matrix, the target feature matrix is mapped to the image subarea corresponding to the image by using the fully connected layer according to the preset anchor area, and the image subarea is connected into the predicted text line, to determine the text area of the image. The target feature matrix corresponding to the to-be-processed image is obtained by using the neural network model, and each element of the target feature matrix is mapped, by using the fully connected layer, to a location corresponding to the image, to obtain a corresponding image subarea; text feature information of the image subarea is obtained, and the text feature of the predicted image subarea is reflected by using the text feature information, to implement segmentation on the image, and the text feature of the image is detected by using each predicted image subarea. Further, neighboring predicted image subareas are connected into a corresponding text line according to the text feature information of the predicted image subarea and the text clustering algorithm, to implement detection on text in a relatively small range. Because text changes are usually small in a small range, the detection accuracy is improved. Neighboring predicted image subareas are generated into a corresponding text line by using the text clustering algorithm. Because the predicted image subareas are combined, even if a space exists in text, after the neighboring predicted image subareas are combined, a character including a space can be combined into a complete character, thereby improving robustness of text detection.

Figure 2:
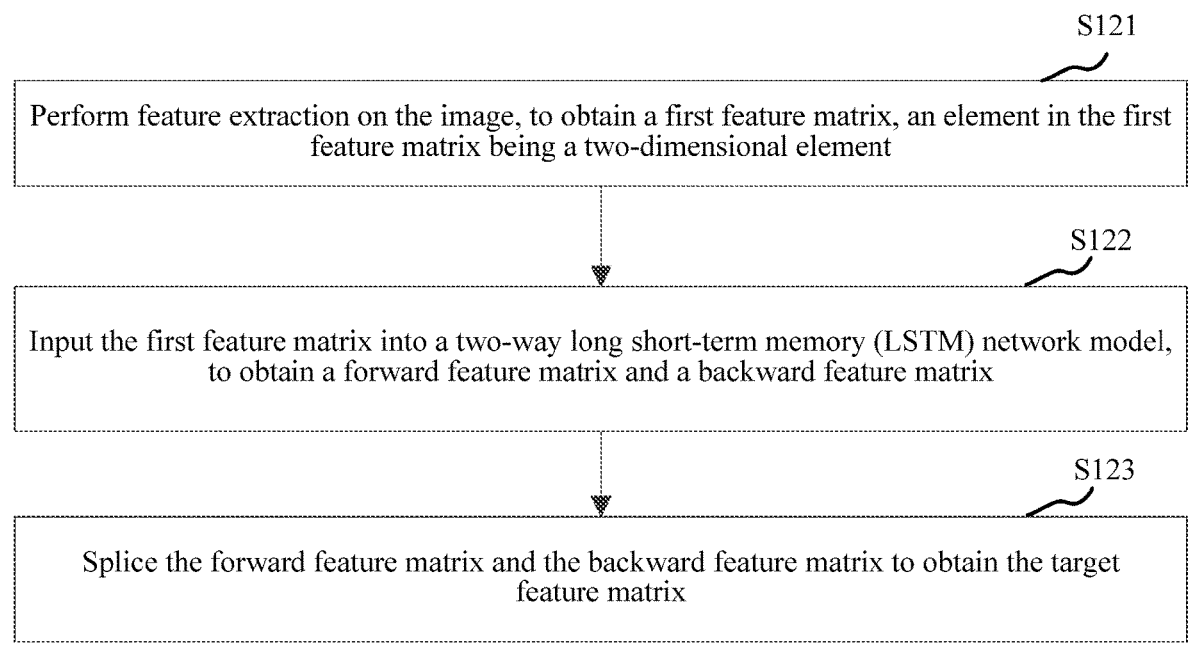
FIG. 2 is a flowchart of a method for generating a target feature matrix in an embodiment.

As shown in FIG. 2, in an embodiment, step S120 includes:

Step S121: Perform feature extraction on the image, to obtain a first feature matrix, an element in the first feature matrix being a two-dimensional element.

Specifically, a residual network is used as a multilayer convolution feature extractor to perform feature extraction on the image, to obtain a feature matrix obtained through multilayer convolution. An element in the feature matrix obtained by extraction is a two-dimensional element, and can represent a location corresponding to the feature. Further, the number of layers of the used residual network may be set according to needs, for example, may be set to 50. Feature extraction is performed on the image by using Res50. Usually, an increased number of layers of the residual network indicates more extracted image features, but after a number of layers is reached, for example, 152, the effect improvement gradually becomes not apparent.

In other embodiments, feature extraction may also be performed on the image by using other network structures, such as VGG19 and ResNet101.

Step S122: Input the first feature matrix into a two-way long short-term memory (LSTM) network model, to obtain a forward feature matrix and a backward feature matrix.

The long short-term memory network model refers to a long short-term memory, a time recurrent neural network. The two-way long short-term memory network model includes a forward long short-term memory network model and a backward long short-term memory network model.

Specifically, after feature extraction is performed on the image, local information of an image is reflected. One word or sentence usually includes a plurality of characters, and there is a strong association between the characters. To reflect global information of the image, an extracted feature is input into an LSTM network for excavating sequence information included in a text area, to obtain the association between the characters. Character sequences on left and right sides are modeled respectively by using two long short-term memory network models, to form complete sequence information, and corresponding sequence information is reflected by using a feature matrix. Specifically, the first feature matrix is separately input into the forward long short-term memory network model and the backward long short-term memory network model. The forward long short-term memory network model processes the first feature matrix to obtain a forward feature matrix. The forward feature matrix reflects forward sequence information. The backward long short-term memory network model processes the first feature matrix to obtain a backward feature matrix. The backward feature matrix reflects backward sequence information. The sequence information represents a connection relationship between image subareas corresponding to feature elements.

Step S123: Splice the forward feature matrix and the backward feature matrix to obtain the target feature matrix.

Specifically, the forward feature matrix and the backward feature matrix are spliced to obtain the target feature matrix. Because the forward feature matrix reflects forward sequence information and the backward feature matrix reflects backward sequence information, the target feature matrix can reflect sequence information of an image subarea corresponding to each element, and represent a connection relationship between image subareas corresponding to the elements.

In this embodiment, feature extraction is performed on the image, and extracted features are used for processing to obtain the target feature matrix. Processing of the original image is converted into processing of a feature corresponding to the original image, thereby greatly reducing information processing dimensions. Further, pictures share a feature extraction layer, to avoid the problem of repeated calculation, thereby improving the information processing efficiency. In addition, the two-way long short-term memory network model is used to separately extract forward and backward sequence information, to reflect the association between feature elements more completely, thereby improving the accuracy of subsequent text area determining.

Figure 3A:
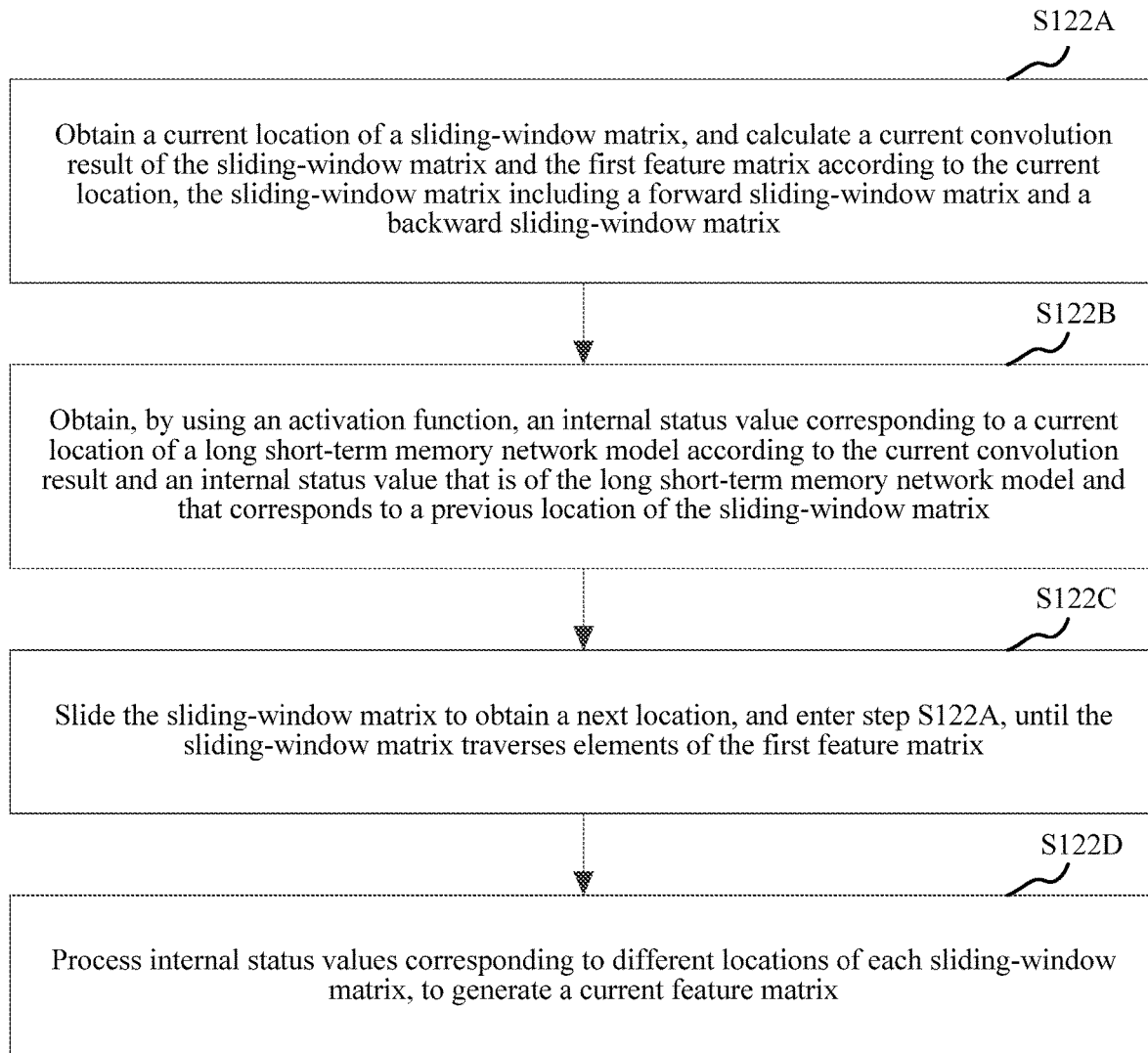
FIG. 3A is a flowchart of a method for generating a target feature matrix in another embodiment.

As shown in FIG. 3A, in an embodiment, step S122 may include:

Step S122A: Obtain a current location of a sliding-window matrix, and calculate a current convolution result of the sliding-window matrix and the first feature matrix according to the current location, the sliding-window matrix including a forward sliding-window matrix and a backward sliding-window matrix. The sliding-window matrix may include a current sliding-window matrix.

A sliding-window matrix refers to a matrix of a sliding window that may slide and that may perform convolution with a target matrix at each sliding location. The sliding-window matrix may include a convolution kernel set according to needs. The scale of the sliding-window matrix may be determined by setting a scale of the corresponding sliding window. For example, when the scale of the sliding window corresponding to the sliding-window matrix is set to 3*3, the sliding-window matrix is a 3*3 matrix.

Specifically, the first feature matrix is separately input into the forward long short-term memory (LSTM) network model and the backward long short-term memory network model, and features extracted from the forward and backward long short-term memory network models are different, namely, results of convolution with the first feature matrix are different. Therefore, different sliding window matrices are respectively disposed in the forward long short-term memory network model and the backward long short-term memory network model, to perform convolution with the first feature matrix, to obtain the corresponding target feature matrix. Further, the sliding-window matrix performs convolution with the first feature matrix at different locations to obtain different convolution results. A current location of the sliding-window matrix is obtained, and when the sliding-window matrix is located at the current location, a part that is of the first feature matrix and that overlaps the sliding-window matrix performs convolution with the sliding-window matrix to obtain a corresponding convolution result.

Step S122B: Obtain, by using an activation function, an internal status value corresponding to a current location of a long short-term memory network model according to the current convolution result and an internal status value that is of the long short-term memory network model and that corresponds to a previous location of the sliding-window matrix.

The activation function refers to a function used for updating a neural network parameter. An internal status value corresponding to the current location of the long short-term memory network model is calculated by using a corresponding convolution result when the sliding-window matrix is located at the current location and an internal status value that is of the neural network model and that corresponds to a previous location.

In one implementation as an example but not a limitation, a sigmoid function $\varphi(x)$ may be used as an activation function, and has an expression as follows:

$$\varphi(x) = \frac{1}{1+e^{-x}}$$

The internal status value H(t) corresponding to the current location of the long short-term memory network model is periodically updated by using the activation function, H t)=$\varphi(H_{t-1}, X_t)$ t=1, 2, . . . , w, where the sliding window generates a convolution result $X_t$ with the first feature matrix at a location corresponding to a moment t, and $H_{t-1}$ represents an internal status value of the long short-term memory model at a moment t−1. Further, if the input long short-term memory network model is a two-way long short-term memory network model, and the internal status dimensions of the forward and backward long short-term memory network models may include 256 dimensions, so that H(t) $\in R^{256}$, and R represents a set of real numbers.

Step S122C: Slide the sliding-window matrix to obtain a next location, and enter step S122A, until the sliding-window matrix traverses elements of the first feature matrix. In one implementation, step S122C may include a step to slide the sliding-window matrix to obtain a next location, and enter step S122A, until the sliding-window matrix traverses all elements of the first feature matrix.

Specifically, the sliding-window matrix can slide on the first feature matrix, and moves by one pixel location each time. When the sliding-window matrix moves to each location, each location corresponds to a convolution result. After the internal status value of the neural network model corresponding to the sliding-window matrix at the current location is obtained, the sliding-window matrix slides to a next location. Step S122A is entered. The internal status value of the neural network model corresponding to a current location of the sliding-window matrix after the sliding-window matrix slides is calculated. The foregoing process is repeatedly performed, until the sliding-window matrix traverses elements of the first feature matrix, to obtain the internal status value of the neural network model corresponding to each location of the current sliding window. Particularly, if the width of the preset anchor is set to a fixed value, such as 16, when the sliding-window matrix slides by one pixel on the first feature matrix, the pixel corresponds to 16 pixels in the image.

Step S122D: Process internal status values corresponding to different locations of each sliding-window matrix, to generate a current feature matrix.

Specifically, the internal status value corresponding to the long short-term memory network model is a middle result of processing the first feature matrix by the long short-term memory network model. The internal status value needs to be further mapped, convolved, or the like to generate the corresponding current feature matrix. The current feature matrix includes a forward feature matrix and a backward feature matrix. The forward feature matrix and the backward feature matrix are spliced into a target feature matrix for output.

In this embodiment, different sliding-window matrixes are respectively used in the forward and backward long short-term memory network models to perform convolution with the first feature matrix, and convolution results corresponding to the locations of the sliding-window matrix are respectively obtained in the forward and backward long short-term memory network models, and the activation function is used to calculate the internal status value that corresponds to each location and that is of the long short-term memory network model, and processing is performed according to the obtained internal status value, to obtain the corresponding current feature matrix. By performing convolution on the sliding-window matrix on the first feature matrix, the problem of repeated calculation brought by sliding on the original image is avoided, thereby reducing time and calculation resources consumed by the sliding window operation.

Figure 3B:
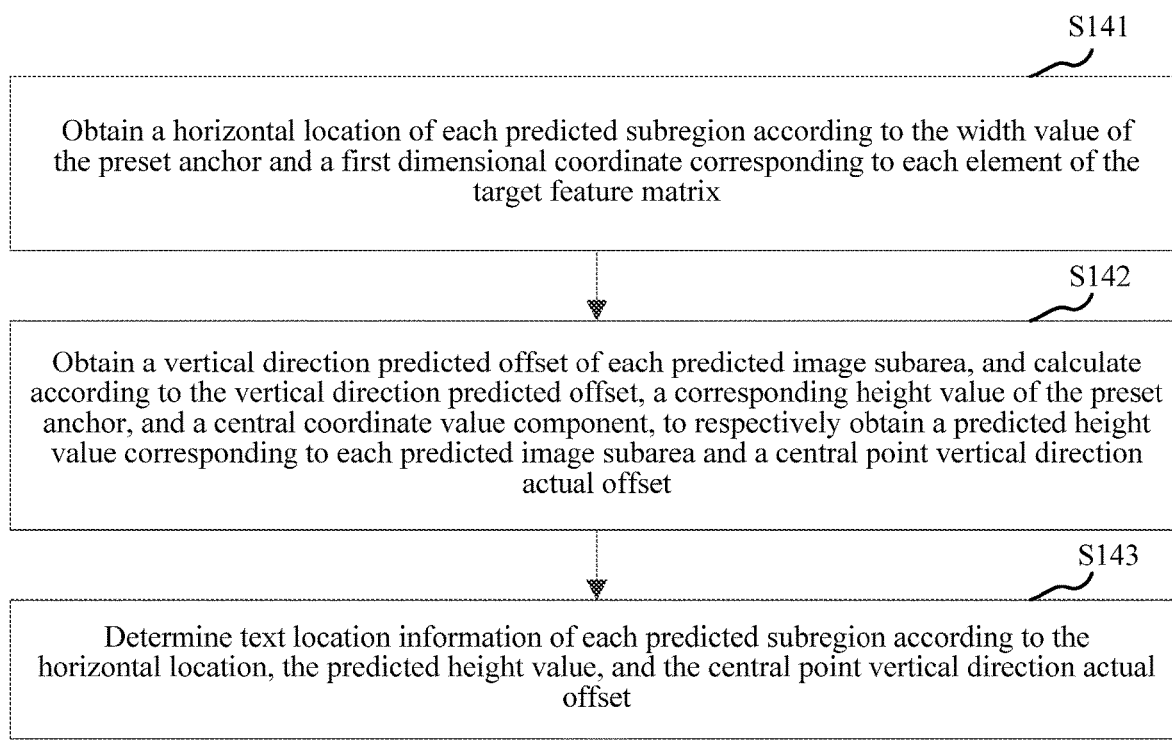
FIG. 3B is a flowchart of obtaining text feature information of a predicted image subarea in an embodiment.

As shown in FIG. 3B, in an embodiment, a width value of the preset anchor is a fixed value, and the step of obtaining text feature information of the predicted image subarea (or subregion) includes:

Step S141: Obtain a horizontal location of each predicted image subarea (or subregion) according to the width value of the preset anchor and a first dimensional coordinate corresponding to each element of the target feature matrix.

Specifically, the width value of the preset anchor is a fixed value, and the width value may be set based on experience, for example, set to 16 pixels. When the width value of the preset anchor is determined, the width value of each predicted image subarea mapped to the image by using the fully connected layer is fixed, and the location of the preset anchor is fixed. The horizontal location of the preset anchor mapped to the original image may be determined according to the location of the target feature matrix in the fully connected layer.

Step S142: Obtain a vertical direction predicted offset of each predicted image subarea, and calculate according to the vertical direction predicted offset, a corresponding height value of the preset anchor, and a central coordinate value component, to respectively obtain a predicted height value corresponding to each predicted image subarea and a central point vertical direction actual offset.

Specifically, text detection is performed on the image by using a text detection model. The text detection model is pre-trained, so that in the process of processing the image, the text detection model can predict to obtain a predicted central point vertical component corresponding to each predicted image subarea (or subregion), and then according to the predicted central point vertical component, perform reverse reasoning, to obtain the predicted height value and the actual central point vertical component that correspond to each image subarea. For example, the following formula is used for calculation:

$$v_c = \frac{(c_y - c_y^a)}{h^a v_h} = \log\frac{h}{h_a}$$

$v_c$ represents a predicted value of a regression object of a vertical component of a text block central point, $c_y$ represents a predicted vertical component of the text block central point, $c_y^a$ represents a vertical component of a central coordinate of a corresponding preset anchor, $h_a$ represents a height of the corresponding preset anchor, $v_h$ represents a predicted value of a height regression target of a text block, and h represents a predicted height of the text block.

After the predicted image subarea (or subregion) corresponding to the image is obtained, a predicted horizontal boundary offset $v_c$ corresponding to each predicted text line can be obtained according to a 2K vertical coordinate component offset prediction task, and an actual central point vertical component $c_y$, and a height h of the predicted image subarea that correspond to each predicted text line can be obtained through reverse reasoning by using the foregoing horizontal offset calculation formula.

Step S143: Determine text location information of each predicted image subarea (or subregion) according to the horizontal location, the predicted height value, and the central point vertical direction actual offset.

Specifically, a corresponding coordinate of each predicted image subarea in the image can be determined according to the horizontal location, the predicted height value, and the central point vertical direction offset of the obtained predicted image subarea and according to the location of the preset anchor, to determine text location information of each predicted image subarea.

In this embodiment, the horizontal location, the height value, and the horizontal direction offset that correspond to each predicted image subarea are obtained through model prediction, to determine a coordinate of each predicted image subarea in the image, to determine text location information of each predicted image subarea, thereby providing basis for subsequently connecting predicted image subareas into a text line. In addition, the width value of the preset anchor is a fixed value, and feasibility of text detected in a preset horizontal range is higher. Further, only the height value of the predicted image subarea needs to be predicted, to reduce the search space for model optimization.

Figure 4:
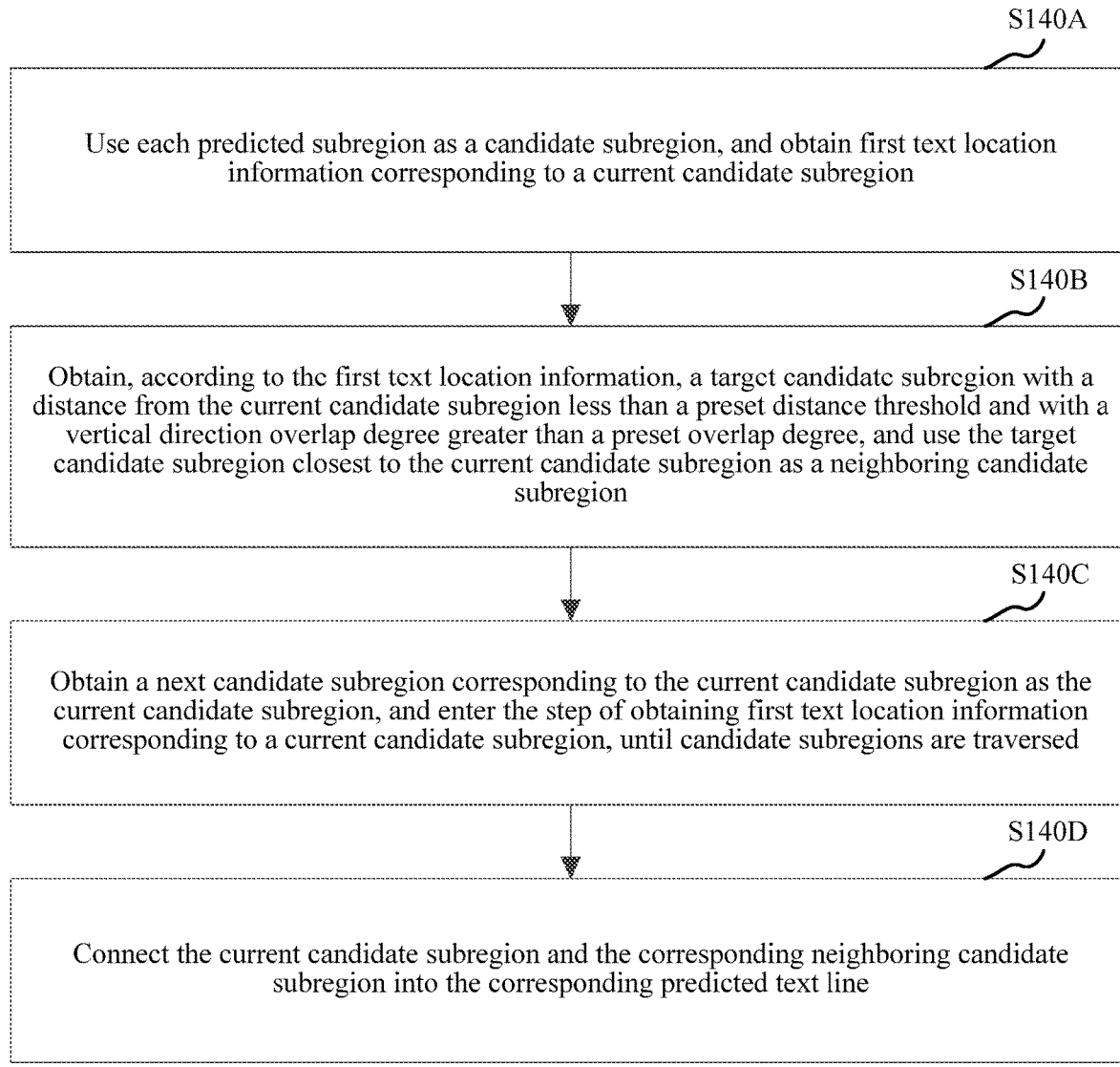
FIG. 4 is a flowchart of a method for generating a predicted text line in an embodiment.

As shown in FIG. 4, in an embodiment, the text feature information may include text location information, and step S140 may include:

Step S140A: Use each predicted image subarea (or subregion) as a candidate subregion, and obtain first text location information corresponding to a current candidate subregion. The candidate subregion may include a candidate subregion.

Specifically, the candidate subregion refers to a subregion predicted as text in the image. A predicted image subarea mapped to the original image according to the target feature matrix may be used as the candidate subregion. First text location information corresponding to the current candidate subregion is obtained according to the text feature information corresponding to the obtained predicted image subarea. The current candidate subregion may be a candidate subregion that is arbitrarily selected, and location information corresponding to the text subarea is obtained.

Step S140B: Obtain, according to the first text location information, a target candidate subregion with a distance from the current candidate subregion less than a preset distance threshold and with a vertical direction overlap degree greater than a preset overlap degree, and use the target candidate subregion closest to the current candidate subregion as a neighboring candidate subregion.

Specifically, each independent predicted image subarea (or subregion) represents a feature of each location of the image. Text corresponding to one image subarea may be incomplete text, and thus, adjacent text needs to be combined together to accurately predict complete text information. Text is usually in units of text lines, and a distance between two adjacent image subareas located in a same text line is relatively short. Therefore, a neighboring candidate subregion corresponding to the current candidate subregion is obtained by setting conditions of the horizontal direction and the vertical direction.

A distance threshold of two candidate subregions in the horizontal direction is preset. The distance threshold may be set according to experience or according to location information of each predicted image subarea. An overlap degree of two candidate subregions in the vertical direction is preset. Because text subareas located in a same text line are basically located on a same straight line, the text subareas should have a relatively high overlap degree in the vertical direction, and the value of the overlap degree may be set according to experience. For example, a distance threshold in the horizontal direction may be preset at 50 pixels, and the overlap degree in the vertical direction may be preset at 0.7.

The target candidate subregion with a horizontal distance from the current candidate subregion less than the preset distance threshold and with a vertical direction overlap degree greater than the preset overlap degree is obtained, and then the target candidate subregion closest to the current candidate subregion in the horizontal direction is selected from target candidate subregions as the neighboring candidate subregion.

Step S140C: Obtain a next candidate subregion corresponding to the current candidate subregion as the current candidate subregion, and enter the step of obtaining first text location information corresponding to a current candidate subregion, until candidate subregions are traversed.

Specifically, each candidate subregion is used as the current candidate subregion in sequence, and the process of determining the neighboring candidate subregion is repeated, until the neighboring candidate subregion corresponding to each candidate subregion is determined.

Step S140D: Connect the current candidate subregion and the corresponding neighboring candidate subregion into the corresponding predicted text line.

Specifically, each candidate subregion and the corresponding neighboring candidate subregion are connected, so that candidate subregions corresponding to a same text line can be connected to each other to obtain the corresponding text line area. Therefore, the text area in the image is determined in units of lines.

In this embodiment, the neighboring candidate subregion corresponding to each candidate subregion is obtained by using a preset condition, and each candidate subregion and a neighboring candidate subregion are connected to predict to obtain a text line corresponding to the image. The text area of the image is reflected in units of lines, to avoid the problem that text information obtained from a single candidate subregion is incomplete, so that the text area of the image can be reflected more accurately.

In an embodiment, the text feature information includes text confidence, and the step of using each predicted image subarea as a candidate subregion includes: obtaining text confidence corresponding to each predicted image subarea; and performing non-maximum suppression on each predicted image subarea according to the text confidence, to obtain a predicted image subarea whose text confidence is greater than a preset text confidence as the candidate subregion.

Specifically, after the predicted image subarea is obtained, the detector detects text confidence corresponding to each predicted image subarea, and determines a probability that each predicted image subarea is a text subarea. Because it is mapped to the image by using the fully connected layer, there may be a plurality of predicted image subareas corresponding to each anchor. To better generate a corresponding text line, the predicted image subareas are filtered, to obtain a predicted image subarea whose text confidence is greater than the preset text confidence. For example, the preset text confidence is set to 0.7, and a predicted image subarea whose text confidence is greater than 0.7 is obtained according to the text confidence corresponding to the predicted image subarea. A predicted image subarea meeting a condition is used as a candidate subregion, to perform a subsequent operation of connecting into a text line.

In this embodiment, after the neighboring image subarea corresponding to each predicted image subarea is obtained according to the preset condition, the predicted image subareas are filtered in advance according to the text confidence. A predicted image subarea whose text confidence exceeds the preset text confidence is used as the candidate subregion, to reduce the calculation time of obtaining the neighboring text subarea, and improve the accuracy of the text line obtained by prediction, thereby improving the accuracy of subsequent text identification results.

In an embodiment, after step S140, the method may further include: obtaining a predicted horizontal direction offset corresponding to each predicted text line, and correcting a horizontal boundary of the predicted text line according to the predicted horizontal boundary offset.

Specifically, text detection is performed on the image by using a text detection model. The text detection model is pre-trained, so that in the process of processing the image, the text detection model can predict to obtain a predicted horizontal boundary offset corresponding to each predicted text line, and then according to the predicted horizontal boundary offset, perform reverse reasoning, to obtain the actual horizontal boundary offset corresponding to each predicted text line. For example, the horizontal direction offset corresponding to each text line is obtained by using the following formula:

$$O=(x_{side}-c_x^a)/w^a$$

O represents a predicted horizontal direction offset regression target, $x_{side}$ represents a predicted value of a left side offset of a current subdivided text block relative to an original text block that is not segmented, $c_x^a$ represents a corresponding anchor central point horizontal component, and $w^a$ represents that a width of the current anchor/text candidate area is a fixed value. Specifically, the text detection model may have a boundary prediction capability after training, and can predict to obtain a text line horizontal direction offset O. The text detection model may obtain an actual horizontal offset $X_{side}$ of the predicted text line according to the regression formula of O.

After the predicted image subarea corresponding to the image is obtained, a predicted horizontal boundary offset O corresponding to each predicted text line can be obtained by using a 1K text line horizontal direction offset prediction task, and an actual horizontal offset $x_{side}$ corresponding to each predicted text line can be obtained through reverse reasoning by using the foregoing horizontal offset calculation formula.

In this embodiment, because the anchor width is preset, the text line determined by the candidate subregion is a multiple of a preset anchor width. However, the real width of the text line is not necessarily a multiple of the anchor width. An error may be corrected by predicting a difference between the text horizontal direction real offset and a calibrated text line boundary truth value, thereby improving the accuracy of the text area predicted by the image.

Figure 5:
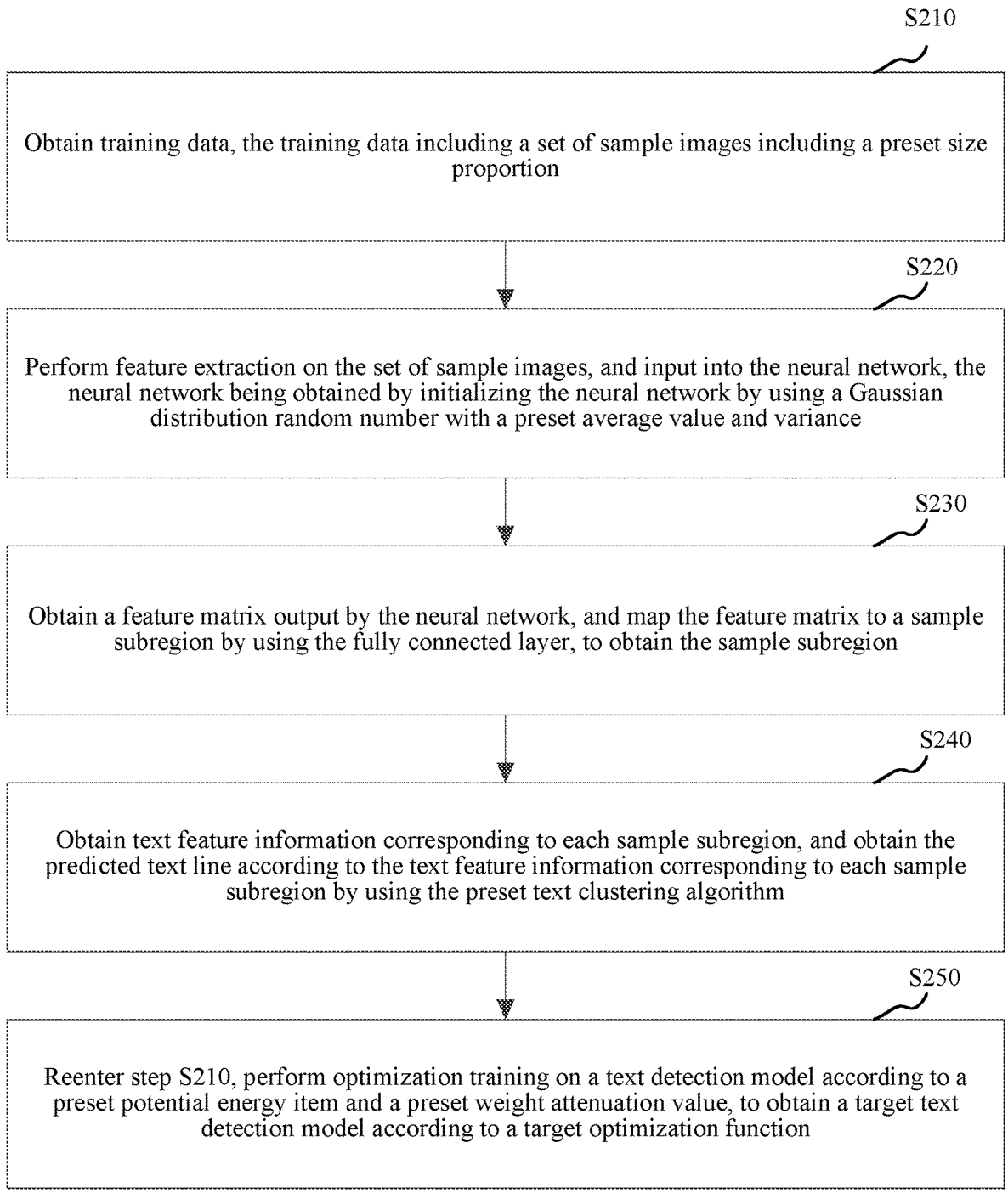
FIG. 5 is a flowchart of a method for training a text detection model in an embodiment.

As shown in FIG. 5, in an embodiment, before step S110, the method further includes:

Step S210: Obtain training data, the training data including a set of sample images including a preset size proportion. The training data may include model training data. The training data may also include a set of subregions in a plurality of sample images. The set of subregions may include same or different size proportion.

The set of sample images may participate in model training. The sample images may be obtained by randomly collecting some areas in an image in an image library. The image library includes a plurality of images. By randomly collecting some areas in an image in the image library, a large amount of training data can be obtained, and the model is trained for a plurality of times.

Specifically, when the model is trained, an aspect ratio of the obtained sample image may be scaled to a preset size, such as 600 pixels, to ensure the size consistence of the sample image area, thereby facilitating extraction and analysis of features. Further, the number of sample images for training the neural network model may be set as 128 each time, and a ratio of positive samples to negative samples may be 1:1. The positive sample refers to a sample image including text, and the negative sample refers to a sample image that does not include text.

Step S220: Perform feature extraction on the set of sample images, and input into the neural network, the neural network being obtained by initializing the neural network by using a Gaussian distribution random number with a preset average value and variance.

The neural network model is initialized by using a Gaussian distribution random number with a preset average value and variance. The neural network model is optimized to obtain the initialized neural network model. For example, a Gaussian distribution random number with an average value of 0 and a variance of 0.001 may be set to optimize the neural network model.

In one implementation, the neural network model and the feature extractor may be trained together. Feature extraction is performed on the set of sample images by using the feature extractor, and an extracted feature is input into the neural network model for processing, so that global feature information of the sample image can be obtained. Feature extraction is performed on each sample image in the set of sample images, and the features are input into the initialized neural network model, so that the initialized neural network model processes the extracted features to obtain corresponding sequence information, and a corresponding feature matrix is output.

Step S230: Obtain a feature matrix outputted by the neural network, and map the feature matrix to a sample subregion by using the fully connected layer, to obtain the sample subregion.

In one implementation, the feature matrix outputted according to the initialized neural network may be mapped to the corresponding sample subregion by using the fully connected layer. Each sample subregion corresponds to a feature matrix. The feature matrix is mapped to the corresponding sample subregion, to obtain the corresponding sample subregion.

Step S240: Obtain text feature information corresponding to each sample subregion, and obtain the predicted text line according to the text feature information corresponding to each sample subregion by using the text clustering algorithm.

In one implementation, text feature information corresponding to each sample subregion may be obtained through classification or regression. For example, a central point vertical direction offset corresponding to each predicted sample image subarea may be trained by using the following formula.

$$v_c = \frac{(c_y - c_y^a)}{h^a v_h} = \log\frac{h}{h_a},$$

$$v_c^* = \frac{(c_y^* - c_y^a)}{h^a v_h^*} = \log\frac{h^*}{h_a}$$

$v_c$ represents a predicted value of a regression object of a vertical component of a text block central point, $c_y$ represents a predicted vertical component of the text block central point, $c_y^a$ represents a vertical component of a central coordinate of a corresponding preset anchor, $h_a$ represents a height of the corresponding preset anchor, $v_h$ represents a predicted value of a height regression target of a text block, $h$ represents a predicted height of the text block, $v_c^*$ represents a truth value of the regression object of the vertical component of the text block central point, $c_y^*$ represents a truth value of the vertical component of the block central point, $v_h^*$ represents a truth value of a height regression target of the block, and $h^*$ represents a truth value of a height of the text block.

$v_c$ is an offset of a central point vertical direction of each predicted sample image subarea (or subregion) that is obtained by prediction in a model training process, $v_c^*$ is a truth value used to predict a central point value component of the sample image subarea, and supervision training is performed on each parameter in $v_c$ by using each parameter in $v_c^*$; in the training process, the value of $v_c$ is made close to the value of $v_c^*$ to the greatest extent, so that when the image is detected, the offset of the central point vertical direction can be predicted, and the offset obtained by prediction is relatively accurate.

In an embodiment, a predicted text line horizontal boundary offset is trained according to the following formula.

$$O=(x_{side}-c_x^a)/w^a, O^*=(x^*_{side}-c_x^a)/w^a$$

O represents a predicted horizontal direction offset regression target, $x_{side}$ represents a predicted value of a left side offset of a current subdivided text block relative to an original text block that is not segmented, $c_x^a$ represents a corresponding anchor central point horizontal component, $w^a$ represents that a width of the current anchor/text candidate area is a fixed value, O* represents a truth value of a regression target of the left side offset of the current subdivided text block relative to the original text block that is not segmented, and $x^*_{side}$ represents a truth value of the left side offset of the current subdivided text block relative to the original text block that is not segmented.

The horizontal boundary offset O of the text line formed by each predicted image subarea (or subregion) is predicted, and supervision training is performed by using the calibrated truth value O*. The value of O is made close to the value of O* to the greatest extent through constant training, so that when a text region of an image is detected, a relatively accurate text line horizontal boundary offset can be predicted.

Specifically, according to the foregoing training process, the text feature information corresponding to each sample image is obtained. The text feature information includes text location information and text confidence. A text line area corresponding to each image sample area is obtained through prediction according to the text feature information of the sample image subarea corresponding to each sample image area, to obtain a set of data of sample image area training, and the parameter of the text detection model is adjusted according to real data of the sample image area.

Step S250: Reenter step S210, perform optimization training on a text detection model according to a preset potential energy item and a preset weight attenuation value, to obtain a target text detection model according to a target optimization function.

In one implementation, a potential energy item is a parameter for maintaining model stability, and a weight attenuation value is a parameter for preventing over-fitting. The text detection model may be trained repeatedly. For example, after training for one time is completed, a set of sample images may be randomly obtained again as training data. An initial learning rate is set. The learning rate refers to a rate of updating a set of parameters of the text detection model. A new set of parameters may be calculated based on a previous set of parameters and the learning rate. For example, a new set of parameters may be calculated by multiplying a previous set of parameters by the learning rate. The learning rate may be set according to experience, for example, set to 0.001. After the model is trained for 90000 times with the learning rate being set to 0.001, the learning rate may iterate to 0.0001, and then iterative training is performed for 10000 times, and the model parameter is updated.

In one implementation, stochastic gradient descent (SGD) optimization is performed on the model according to the preset potential energy item and weight attenuation. For example, the potential energy may be set to 0.9, and the weight attenuation may be set to 0.0005. The preset potential energy item is set to prevent a jitter in a training process, to improve the stability in a model optimization process, and avoid jump on an extreme point. In one implementation, for example, a target function for model optimization is set as follows:

$$L(s_i, v_j, o_k) = \frac{1}{N_s}\sum_i L_s^{cl}(s_i, s_i^*) + \frac{\theta_1}{N_v}\sum_j L_v^{re}(v_j, v_j^*) + \frac{\theta_2}{N_o}\sum_k L_o^{re}(o_k, o_k^*)$$

$L(s_i, v_j, o_k)$ represents a global optimization target function, $L_s^{cl}$, $L_v^{re}$, and $L_o^{re}$ respectively represent loss functions of text classification, text positioning, and boundary optimization tasks, $s_i$ represents a probability that an $i^{th}$ anchor is predicted as text, $s_i^*$ represents a truth value of whether the $i^{th}$ anchor is text, $v_j$ represents a predicted value of a vertical direction coordinate of a $j^{th}$ anchor, $v_j^*$ represent a truth value of the vertical direction coordinate of the $j^{th}$ anchor, $o_k$ represents a predicted value of a horizontal offset of a $k^{th}$ boundary anchor relative to a boundary, and $o_k^*$ represents a truth value of the horizontal offset of the $k^{th}$ boundary anchor relative to the boundary. $\theta_1$ and $\theta_2$ are respectively loss weights of the text positioning task and the boundary optimization task. $N_s$, $N_v$, and $N_o$ respectively represent the numbers of anchors used in the text classification, text positioning, and boundary optimization tasks in each training batch.

The text detection model is optimized according to the target optimization function, to obtain each parameter corresponding to the text detection model, and obtain the trained target text detection model, and text detection is performed on the input image.

In this embodiment, the sample image area is obtained as training data, and text detection is performed on the sample image area by using the text detection model. The training process is constantly repeated, and a preset potential energy item, an attenuation weight, and a learning rate are preset. The target optimization function is established to optimize the text detection model. A parameter of the text detection model is finally determined to obtain an optimized text detection model for performing text prediction on the actual image. The text detection model is constantly trained and optimized by using a large amount of training data and the target optimization function, and the neural network model and the feature extractor are combined for training. Extracted features are further processed, and global text information of the sample image area is obtained, to improve the accuracy of predicting the text area in the image by the text detection model.

Figure 6:
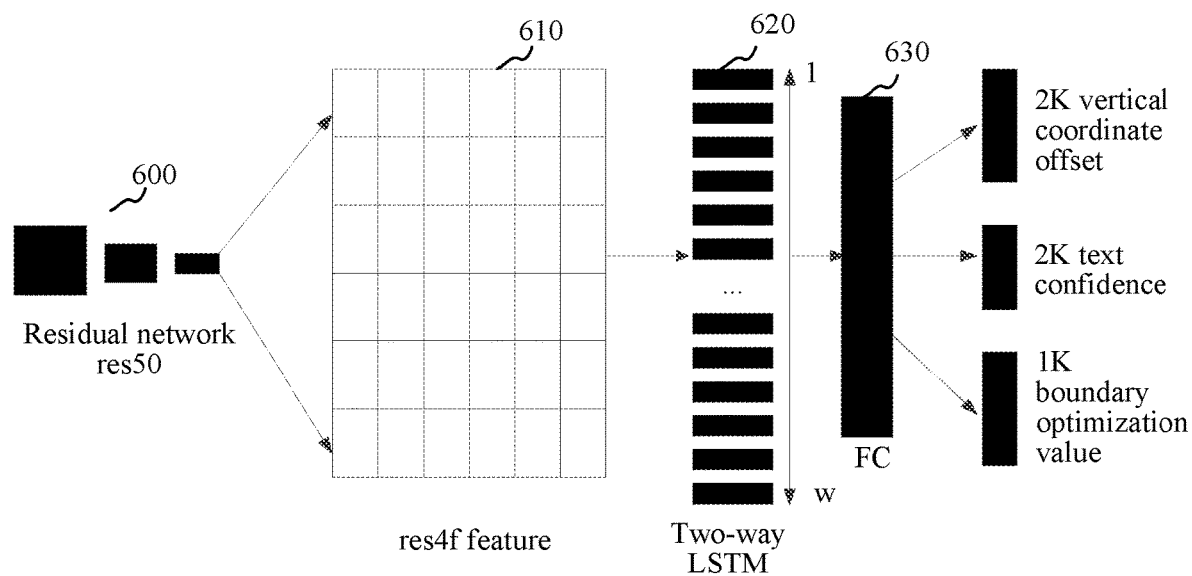
FIG. 6 is an architectural diagram of a principle of a text detection method in an embodiment.

FIG. 6 is an architectural diagram of one embodiment of a text detection method. First, a 50-layer residual network 600 is used to perform feature extraction on the image. The res4f feature 610 is obtained through multilayer convolutional network feature extraction. The res4f feature is input into a two-way long short-term memory network LSTM 620 to establish a text candidate area sequence, and feature mapping is performed on the text candidate area sequence by using a fully connected layer FC 630, and a 2K vertical coordinate offset, a 2K text confidence, and a 1K boundary optimization value are predicted according to the mapping result, where K is the number of anchors on each pixel on the res4f.

The text candidate area location information is determined by predicting the vertical coordinate offset and the horizontal boundary offset, and it is determined whether the candidate area is the text area according to the predicted text confidence, to predict the text area in the image.

Figure 7:
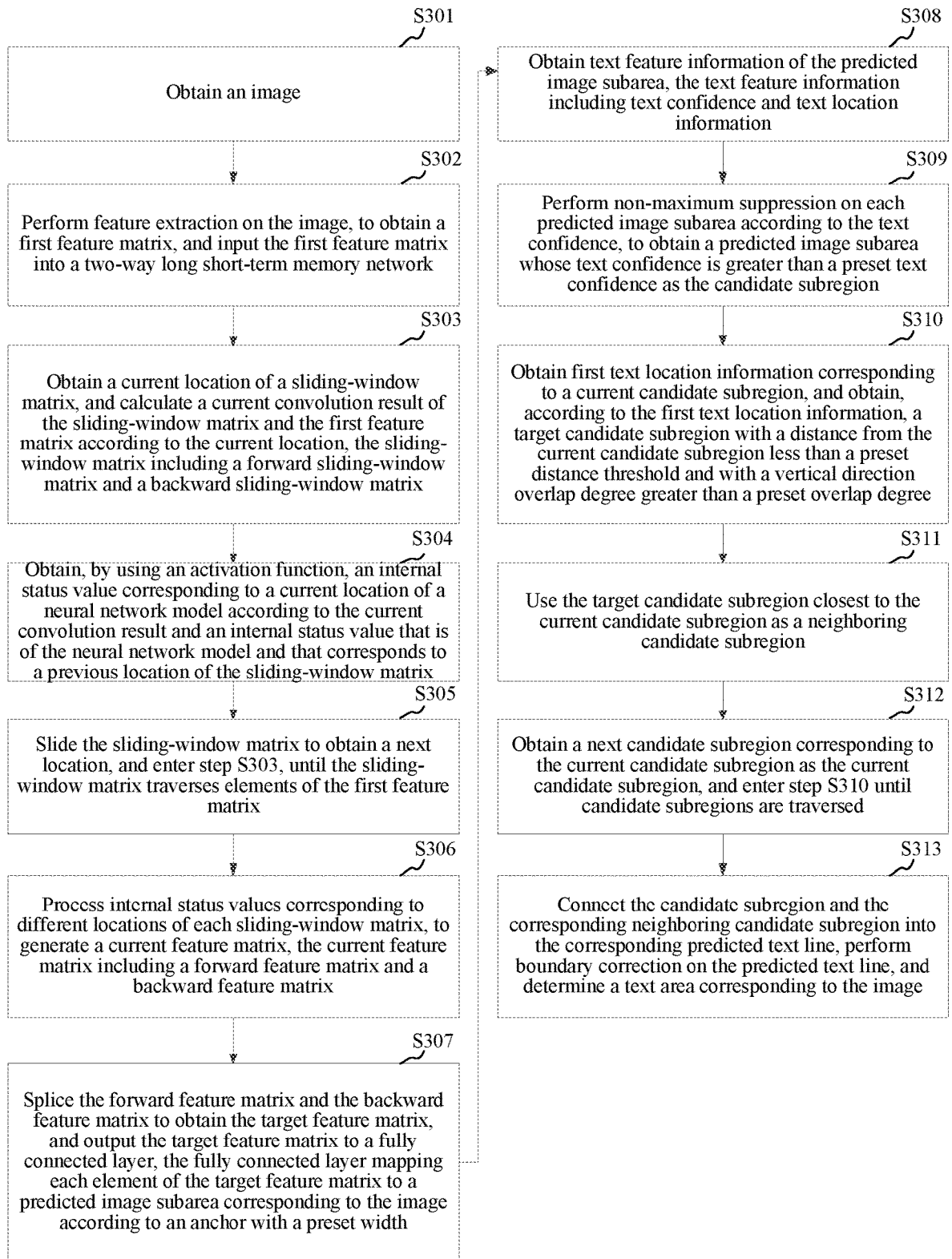
FIG. 7 is a flowchart of a text detection method in a specific embodiment.

As shown in FIG. 7, in a specific embodiment, a text detection algorithm is provided and includes the following content:

Step S301: Obtain an image. The image may include a to-be-detected image.

Step S302: Perform feature extraction on the image, to obtain a first feature matrix, and input the first feature matrix into a two-way long short-term memory (LSTM) network.

Step S303: Obtain a current location of a sliding-window matrix, and calculate a current convolution result of the sliding-window matrix and the first feature matrix according to the current location, the sliding-window matrix including a forward sliding-window matrix and a backward sliding-window matrix. In another implementation, step S303 may include to obtain, by using an activation function, an internal status value corresponding to a current location of a neutral network model according to the current convolution result and an internal status value that is of the neural network model and that corresponds to a previous location of the current sliding window matrix.

Step S304: Obtain, by using an activation function, an internal status value corresponding to a current location of a neural network model according to the current convolution result and an internal status value that is of the neural network model and that corresponds to a previous location of the sliding-window matrix. In another implementation, step S304 may include to obtain text feature information corresponding to each sample image subarea, and obtain a predicted text line according to the text feature information and a preset text clustering algorithm.

Step S305: Slide the sliding-window matrix to obtain a next location, and enter step S303, until the sliding-window matrix traverses elements of the first feature matrix.

Step S306: Process internal status values corresponding to different locations of each sliding-window matrix, to generate a current feature matrix, the current feature matrix including a forward feature matrix and a backward feature matrix.

Step S307: Splice the forward feature matrix and the backward feature matrix to obtain the target feature matrix, and output the target feature matrix to a fully connected layer, the fully connected layer mapping each element of the target feature matrix to a predicted image subarea corresponding to the image according to an anchor with a preset width.

Step S308: Obtain text feature information of the predicted image subarea, the text feature information including text confidence and text location information.

Step S309: Perform non-maximum suppression on each predicted image subarea according to the text confidence, to obtain a predicted image subarea whose text confidence is greater than a preset text confidence as the candidate subregion.

Step S310: Obtain first text location information corresponding to a current candidate subregion, and obtain, according to the first text location information, a target candidate subregion with a distance from the current candidate subregion less than a preset distance threshold and with a vertical direction overlap degree greater than a preset overlap degree.

Step S311: Use the target candidate subregion closest to the current candidate subregion as a neighboring candidate subregion.

Step S312: Obtain a next candidate subregion corresponding to the current candidate subregion as the current candidate subregion, and enter step S310 until candidate subregions are traversed.

Step S313: Connect the candidate subregion and the corresponding neighboring candidate subregion into the corresponding predicted text line, perform boundary correction on the predicted text line, and determine a text area corresponding to the image.

In this embodiment, first, feature extraction is performed on the image, and then the extracted features are input into the two-way long short-term memory network model to obtain the target feature matrix. The target feature matrix is mapped to the image subarea corresponding to the image according to the preset anchor by using the fully connected layer, and the candidate subregion is determined according to the text location information and the text confidence of the image subarea, and a neighboring subarea of the candidate subregion is selected; neighboring candidate subregions are connected to generate the predicted text line, to determine the text area of the image. First, feature extraction is performed on the image, and then extracted features are extracted by using the two-way long short-term memory network model, to reduce dimensions of image processing, and improve the calculation efficiency. The obtained target feature matrix is mapped, by using the fully connected layer, to a location corresponding to the image, to obtain a corresponding image subarea; text feature information of the image subarea is obtained, to implement segmentation on the image, and the text feature of the image is detected by using each predicted image subarea, and the preset anchor has a fixed width value, so that the width value of the obtained predicted image subarea is fixed, to implement detection on text in a relatively small range. Because text changes are usually small in a small range, the detection accuracy is improved. Neighboring predicted image subareas are generated into a corresponding text line by using the text clustering algorithm. Because the predicted image subareas are combined, even if a space exists in text, after the neighboring predicted image subareas are combined, a character including a space can be combined into a complete character, thereby improving robustness of text detection.

It should be understood that although the steps in the embodiments of this application are not necessarily performed in an order indicated by the step numbers. Unless explicitly stated in this specification, the execution of these steps is not strictly sequential, and these steps may be executed in another sequence. Moreover, at least some of the steps in each embodiment may include a plurality of sub-steps or stages, which may not necessarily be completed at the same moment, but may be performed at different moments. These sub-steps or stages are not necessarily performed in sequence, but may be performed in turn or alternately with at least some of other steps or sub-steps or stages of the other steps.

Figure 8:
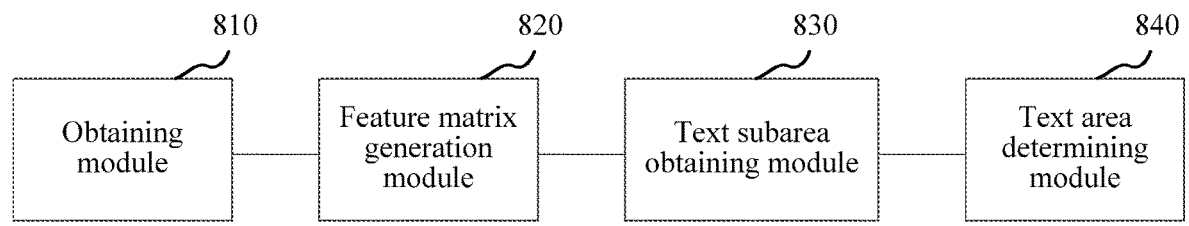
FIG. 8 is a structural block diagram of a text detection apparatus in an embodiment.

As shown in FIG. 8, in an embodiment, a text detection apparatus is provided, and includes:

an obtaining module 810, configured to obtain an image including a to-be-detected image;

a feature matrix generation module 820, configured to: input the image into a neural network model, and output a target feature matrix;

a text subarea obtaining module 830, configured to input the target feature matrix into a fully connected layer, the fully connected layer mapping each element of the target feature matrix to a predicted image subarea corresponding to the image according to a preset anchor; and a text area determining module 840, configured to: obtain text feature information of the predicted image subarea, connect the predicted image subarea into a corresponding predicted text line according to the text feature information of the predicted image subarea by using a text clustering algorithm, and determine a text area corresponding to the image.

In this embodiment, the text detection apparatus inputs the image into the neural network model, to obtain the target feature matrix, the target feature matrix is mapped to the image subarea corresponding to the image by using the fully connected layer according to the preset anchor, and the image subarea is connected into the predicted text line, to determine the text area of the image. The target feature matrix corresponding to the to-be-processed image is obtained by using the neural network model, and each element of the target feature matrix is mapped, by using the fully connected layer, to a location corresponding to the image, to obtain a corresponding image subarea; text feature information of the image subarea is obtained, and the text feature of the predicted image subarea is reflected by using the text feature information, to implement segmentation on the image, and the text feature of the image is detected by using each predicted image subarea, to implement detection on text in a relatively small range. Because text changes are usually small in a small range, the detection accuracy is improved. Neighboring predicted image subareas are generated into a corresponding text line by using the text clustering algorithm. Because the predicted image subareas are combined, even if a space exists in text, after the neighboring predicted image subareas are combined, a character including a space can be combined into a complete character, thereby improving robustness of text detection.

In an embodiment, the feature matrix generation module 820 is further configured to: perform feature extraction on the image, to obtain a first feature matrix, an element in the first feature matrix being a two-dimensional element; input the first feature matrix into a two-way long short-term memory network model, to obtain a forward feature matrix and a backward feature matrix; and splice the forward feature matrix and the backward feature matrix to obtain the target feature matrix.

Figure 9:
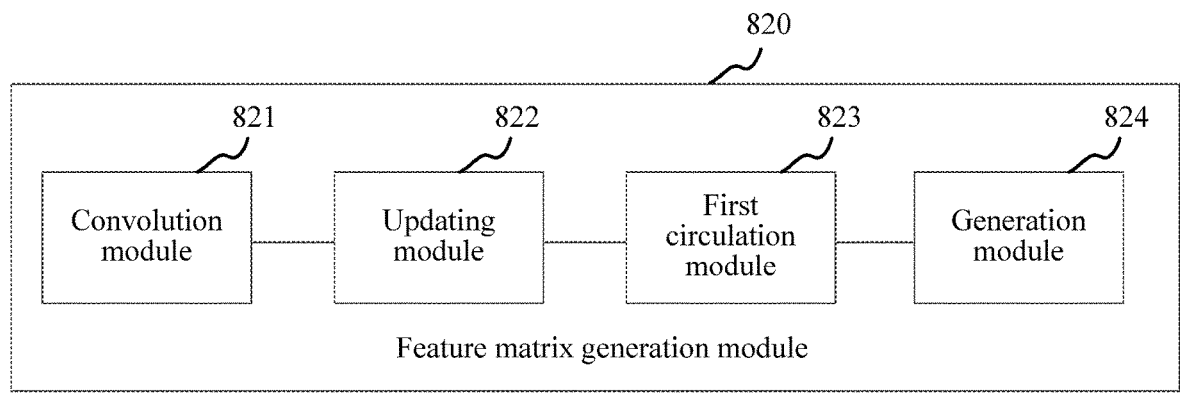
FIG. 9 is a structural block diagram of a feature matrix generation module in an embodiment.

As shown in FIG. 9, in an embodiment, the feature matrix generation module 820 includes:

a convolution module 821, configured to: obtain a current location of a sliding-window matrix, and calculate a current convolution result of the sliding-window matrix and the first feature matrix according to the current location, the sliding-window matrix including a forward sliding-window matrix and a backward sliding-window matrix;

an updating module 822, configured to obtain, by using an activation function, an internal status value corresponding to a current location of a long short-term memory network model according to the current convolution result and an internal status value that is of the long short-term memory network model and that corresponds to a previous location of the sliding-window matrix;

a first circulation module 823, configured to: slide the sliding-window matrix to obtain a next location, and enter an operation of obtaining the current location of the sliding-window matrix, until the sliding-window matrix traverses elements of the first feature matrix; and a generation module 824, configured to process internal status values corresponding to different locations of each sliding-window matrix, to obtain a current feature matrix.

Figure 10:
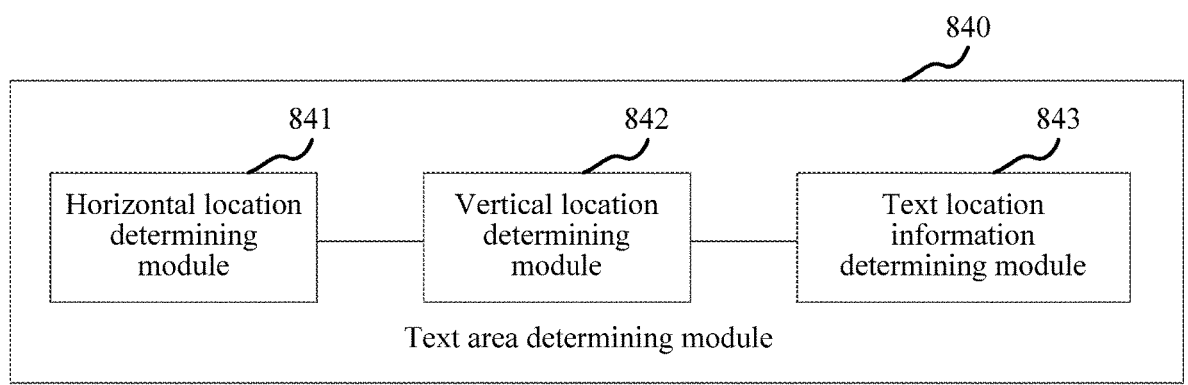
FIG. 10 is a structural block diagram of a text area determining module in an embodiment.

As shown in FIG. 10, in an embodiment, a width value of the preset anchor is a fixed value, and the text area determining module 840 includes:

a horizontal location determining module 841, configured to obtain a horizontal location of each predicted image subarea according to the width value of the preset anchor and a first dimensional coordinate corresponding to each element of the target feature matrix;

a vertical location determining module 842, configured to: obtain a vertical direction predicted offset of each predicted image subarea, and calculate according to the vertical direction predicted offset, a corresponding height value of the preset anchor, and a central coordinate value component, to respectively obtain a predicted height value corresponding to each predicted image subarea and a central point vertical direction actual offset; and a text location information determining module 843, configured to determine text location information of each predicted image subarea according to the horizontal location, the predicted height value, and the central point vertical direction actual offset.

Figure 11:
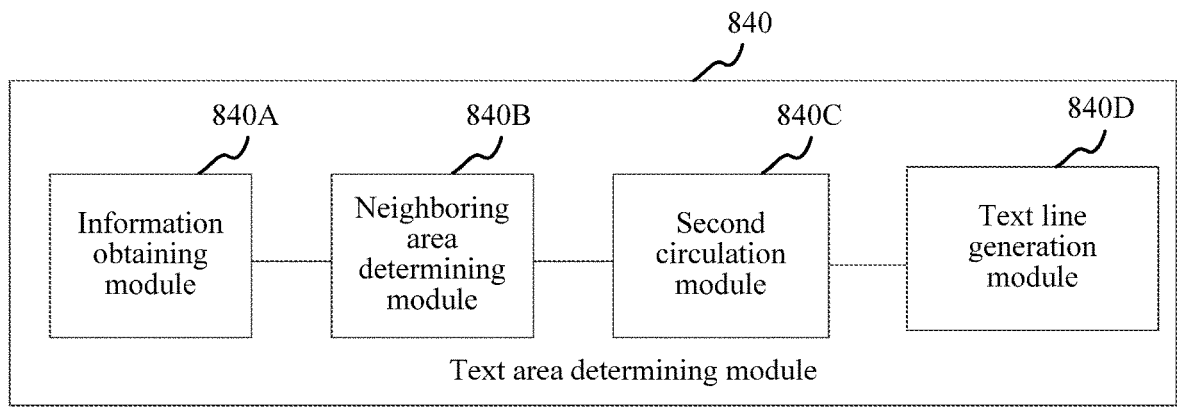
FIG. 11 is a structural block diagram of a text area determining module in another embodiment.

As shown in FIG. 11, in an embodiment, the text feature information includes text location information. The text area determining module 840 includes:

an information obtaining module 840A, configured to: use each predicted image subarea as a candidate subregion, and obtain first text location information corresponding to a current candidate subregion;

a neighboring area determining module 840B, configured to: obtain, according to the first text location information, a target candidate subregion with a distance from the current candidate subregion less than a preset distance threshold and with a vertical direction overlap degree greater than a preset overlap degree, and use the target candidate subregion closest to the current candidate subregion as a neighboring candidate subregion;

a second circulation module 840C, configured to: obtain a next candidate subregion corresponding to the current candidate subregion as the current candidate subregion, and enter the step of obtaining first text location information corresponding to a current candidate subregion, until candidate subregions are traversed; and a text line generation module 840D, configured to connect the candidate subregion and the corresponding neighboring candidate subregion into the corresponding predicted text line.

In an embodiment, the text feature information includes text confidence, and the information obtaining module 840A is further configured to: obtain text confidence corresponding to each predicted image subarea; and perform non-maximum suppression on each predicted image subarea according to the text confidence, to obtain a predicted image subarea whose text confidence is greater than a preset text confidence as the candidate subregion.

Figure 12:
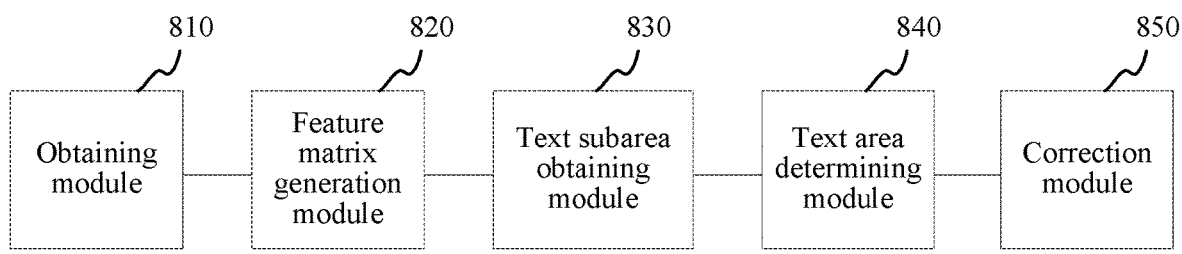
FIG. 12 is a structural block diagram of a text detection apparatus in another embodiment.

As shown in FIG. 12, in an embodiment, the text detection apparatus further includes:

a correction module 850, configured to: obtain a predicted horizontal direction offset corresponding to each predicted text line, and correct a horizontal boundary of the predicted text line according to the predicted horizontal boundary offset.

Figure 13:
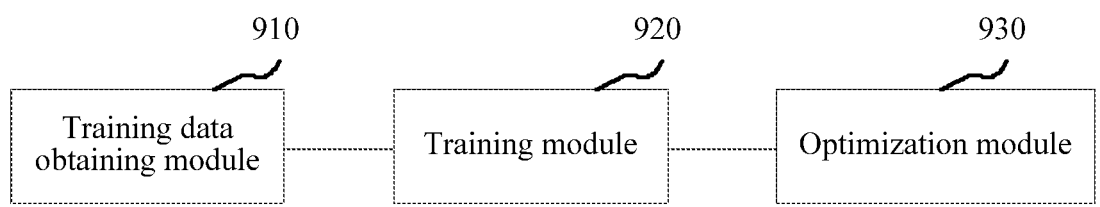
FIG. 13 is a structural block diagram of a text detection apparatus in still another embodiment.

As shown in FIG. 13, in an embodiment, the text detection apparatus further includes:

a training data obtaining module 910, configured to obtain model training data, the model training data including a sample image area set of a preset size proportion;

a training module 920, configured to: perform feature extraction on the sample image area set, and input into an initialized neural network model, the initialized neural network model being obtained by initializing a neural network model by using a Gaussian distribution random number with a preset average value and variance; obtain a feature matrix outputted by the initialized neural network model, and map the feature matrix to a corresponding sample image area by using the fully connected layer, to obtain a corresponding sample image subarea; obtain text feature information corresponding to each sample image subarea, and obtain the predicted text line according to the text feature information and a preset text clustering algorithm; and an optimization module 930, configured to: reenter the step of obtaining model training data, perform optimization training on a text detection model according to a preset potential energy item and a preset weight attenuation value, and obtain a target text detection model according to a target optimization function.

Figure 14:
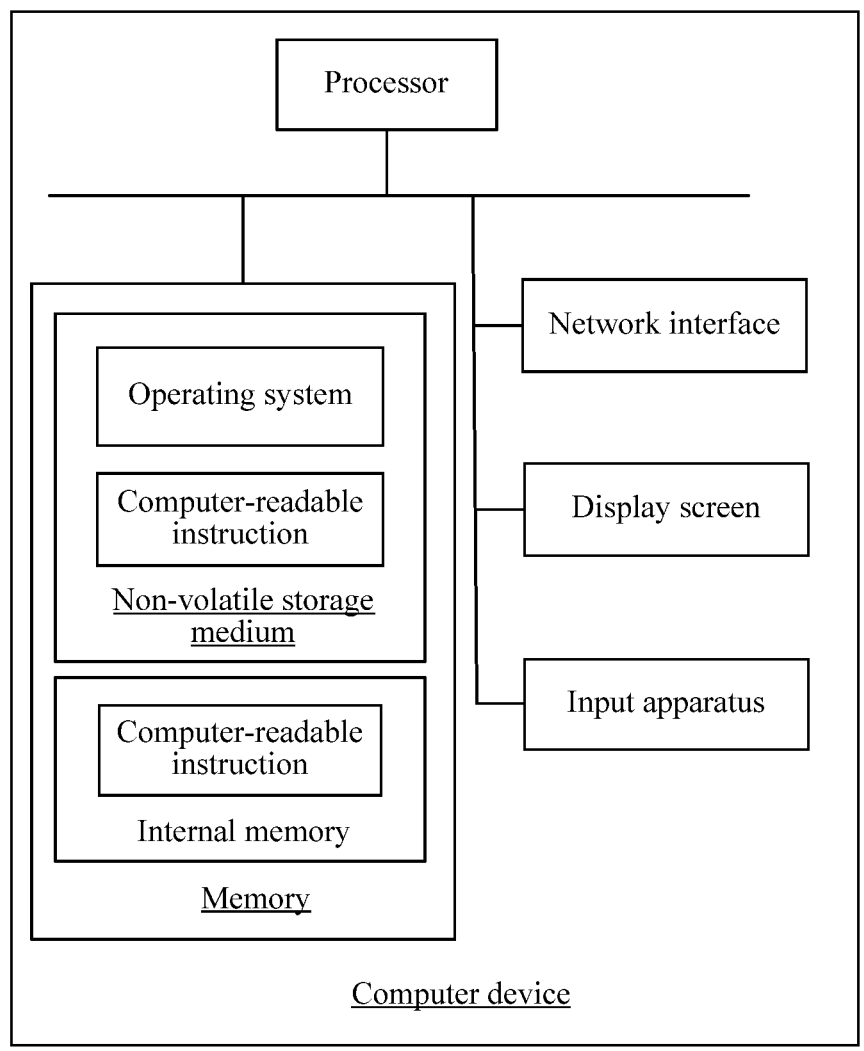
FIG. 14 is a diagram of an internal structure of a computer device in an embodiment.

FIG. 14 is a diagram of an internal structure of a computer device according to an embodiment. The computer device may be specifically a terminal. As shown in FIG. 14, the computer device includes a processor, a memory, a network interface, an input apparatus and a display screen that are connected by using a system bus. The memory includes a non-volatile storage medium and an internal memory. The non-volatile storage medium of the computer device stores an operating system, and may further store computer-readable instructions. The computer-readable instructions, when executed by the processor, may cause the processor to implement a text detection method. The internal memory may also store computer-readable instructions. The computer-readable instructions, when executed by the processor, may cause the processor to implement a text detection method. The display screen of the computer device may be a liquid crystal display screen or an e-ink display screen. The input apparatus of the computer device may be a touch layer covering the display screen, or may be a button, a trackball, or a touchpad disposed on a housing of the computer device, or may be an external keyboard, touchpad, a mouse or the like.

Figure 15:
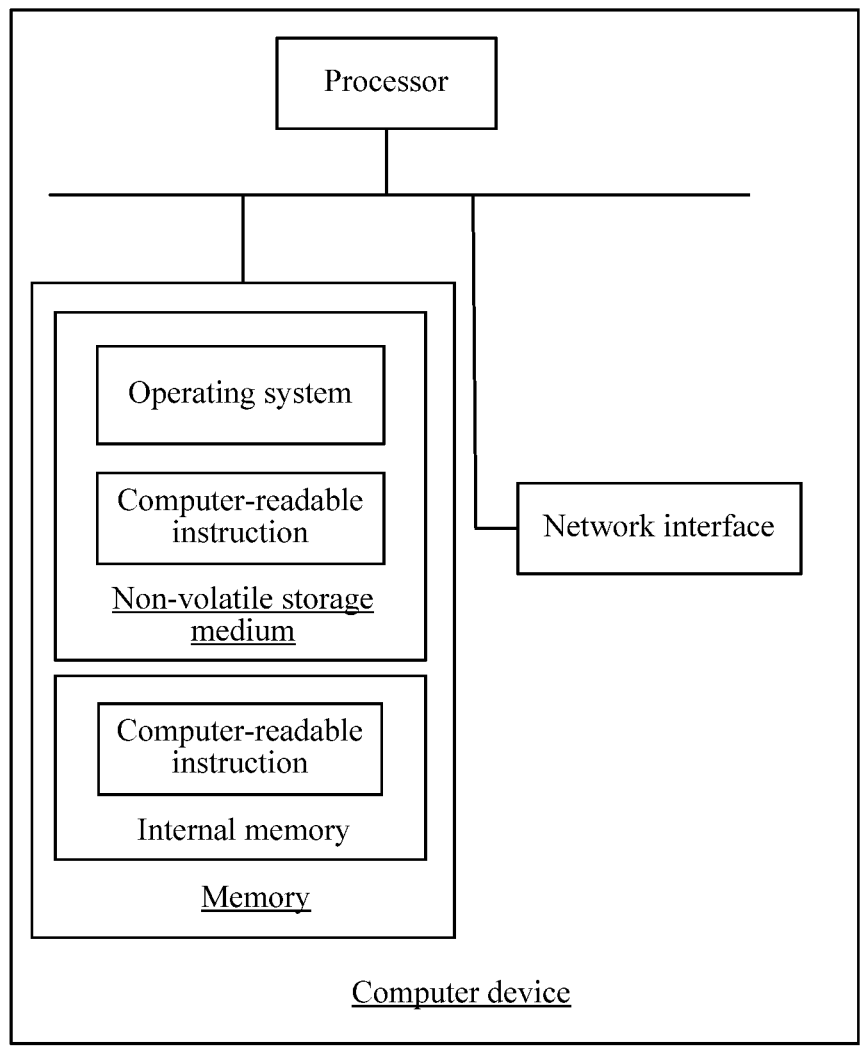
FIG. 15 is a diagram of an internal structure of a computer device in another embodiment.

FIG. 15 is a diagram of an internal structure of a computer device according to an embodiment. The computer device may be specifically a server. As shown in FIG. 15, the computer device includes a processor, a memory, and a network interface that are connected by using a system bus. The memory includes a non-volatile storage medium and an internal memory. The non-volatile storage medium of the computer device stores an operating system, and may further store computer-readable instructions. The computer-readable instructions, when executed by the processor, may cause the processor to implement a text detection method. The internal memory may also store computer-readable instructions. The computer-readable instructions, when executed by the processor, may cause the processor to implement a text detection method.

A person skilled in the art may understand that, the structure shown in FIG. 14 and FIG. 15 is merely a block diagram of a partial structure related to a solution in this application, and does not constitute a limitation to the computer device to which the solution in this application is applied. Specifically, the computer device may include more components or fewer components than those shown in the figure, or some components may be combined, or a different component deployment may be used.

In an embodiment, the text detection apparatus provided in this application may be implemented as a form of a computer-readable instruction. The computer-readable instruction may run on the computer device shown in FIG. 14 and FIG. 15. A non-volatile storage medium of the computer device may store program modules forming the text detection apparatus, for example, the obtaining module 810, the feature matrix generation module 820, the text subarea obtaining module 830, and the text area determining module 840 in FIG. 8. Each program module includes a computer-readable instruction. The computer-readable instruction is used to enable the computer device to perform steps in the text detection method in each embodiment of this application that is described in this specification. The processor in the computer device can invoke each program module of the text detection apparatus stored in the non-volatile storage medium of the computer device, to run a corresponding readable instruction, and implement functions corresponding to the modules of the text detection apparatus in this specification. For example, the computer device may obtain the image by using the obtaining module 810 in the text detection apparatus shown in FIG. 8, input the image into the neural network model by using the feature matrix generation module 820, output the target feature matrix, and input the target feature matrix into the fully connected layer by using the text subarea obtaining module 830. The fully connected layer maps each element of the target feature matrix to the predicted image subarea corresponding to the image according to the preset anchor. The computer device obtains the text feature information of the predicted image subarea by using the text area determining module, connects the predicted image subarea into the corresponding predicted text line according to the text feature information of the predicted image subarea by using the text clustering algorithm, and determines the text area corresponding to the image.

A person of ordinary skill in the art may understand that all or some of the processes of the methods in the foregoing embodiments may be implemented by a computer instruction instructing relevant hardware. The computer instruction may be stored in a non-volatile computer-readable storage medium. When the computer instruction is executed, the processes of the foregoing methods in the embodiments are performed. Any reference to a memory, storage, database or other medium used in the various embodiments provided herein may include non-volatile and/or volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external cache. By way of illustration and not limitation, the RAM is available in various forms, such as a static RAM (SRAM), a dynamic RAM (DRAM), a synchronous DRAM (SDRAM), a double data rate SDRAM (DDRSDRAM), an enhanced SDRAM (ESDRAM), a synchronization link (Synchlink) DRAM (SLDRAM), a rambus (Rambus) direct RAM (RDRAM), a direct rambus dynamic RAM (DRDRAM), and a rambus dynamic RAM (RDRAM).

The foregoing embodiments show only several implementations of this application, and descriptions thereof are in detail, but shall not be understood as limiting the patent scope of this application. It is to be noted that various changes and improvements may further be made by a person of ordinary skill in the art without departing from the idea of this application, and these changes and improvements all fall within the protection scope of this application. Therefore, the protection scope of this application shall be subject to the appended claims.

What is claimed is:

1. A method for performing text detection, the method comprising:
    obtaining, by a computer device comprising a memory storing instructions and a processor in communication with the memory, an image;
    inputting, by the computer device, the image into a neural network to obtain a target feature matrix by:
        performing, by the computer device, feature extraction on the image to obtain a first feature matrix, an element in the first feature matrix comprising a two-dimensional element,
        inputting, by the computer device, the first feature matrix into a two-way long short-term memory (LSTM) network to obtain a forward feature matrix and a backward feature matrix, and
        splicing, by the computer device, the forward feature matrix and the backward feature matrix to obtain the target feature matrix;
    inputting, by the computer device, the target feature matrix into a fully connected layer to map each element of the target feature matrix to a predicted subregion according to a preset anchor;
    obtaining, by the computer device, text feature information of the predicted subregion;
    connecting the predicated subregion into a predicted text line according to the text feature information of the predicated subregion by using a text clustering algorithm; and
    determining a text area corresponding to the image based on the predicted text line.

2. The method according to claim 1, wherein the inputting the first feature matrix into the two-way LSTM network to obtain the forward feature matrix and the backward feature matrix comprises:
    obtaining, by the computer device, a current location of a sliding-window matrix, and calculating a current convolution result of the sliding-window matrix and the first feature matrix according to the current location, the sliding-window matrix comprising a forward sliding-window matrix and a backward sliding-window matrix;

obtaining, by the computer device, a current internal status value of the two-way LSTM network corresponding to the current location of the sliding-window matrix by using an activation function based on the current convolution result and a previous internal status value of the two-way LSTM network corresponding to a previous location of the sliding-window matrix;

sliding, by the computer device, the sliding-window matrix to a next location, setting the next location as the current location, and repeating an operation of obtaining the current location of the sliding-window matrix until the sliding-window matrix traverses elements of the first feature matrix; and processing, by the computer device, internal status values of the two-way LSTM network corresponding to different locations of the sliding-window matrix, to generate a current feature matrix comprising the forward feature matrix and the backward feature matrix.

3. The method according to claim 1, wherein:

a width of the preset anchor comprises a fixed value;

the text feature information comprises text location information; and obtaining the text feature information of the predicated subregion comprises:

for each element of the target feature matrix:

obtaining, by the computer device, a horizontal location of the predicated subregion according to the width of the preset anchor and a first dimensional coordinate corresponding to each element of the target feature matrix, obtaining, by the computer device, a vertical-direction predicted offset of the predicated subregion, calculating according to the vertical-direction predicted offset, a height value of the preset anchor, and a central coordinate value component, to respectively obtain a predicted height value corresponding to the predicated subregion and a central-point vertical-direction actual offset, and determining, by the computer device, the text location information of the predicated subregion according to the horizontal location, the predicted height value, and the central-point vertical-direction actual offset.

4. The method according to claim 1, wherein:

the text feature information comprises text location information; and connecting the predicated subregion into the predicted text line according to the text feature information of the predicated subregion by using the text clustering algorithm comprises:

using, by the computer device, each predicated subregion as a current candidate subregion, to obtain first text location information corresponding to the current candidate subregion;

obtaining, by the computer device according to the first text location information, a target candidate subregion with a distance less than a preset distance threshold from the current candidate subregion and with a vertical-direction overlap degree greater than a preset overlap degree threshold, and using the target candidate subregion closest to the current candidate subregion as a neighboring candidate subregion;

obtaining, by the computer device, a next candidate subregion corresponding to the current candidate subregion as a current candidate subregion, and repeating a step of obtaining first text location information corresponding to the current candidate subregion, until candidate subregions are traversed; and connecting, by the computer device, a candidate subregion and corresponding neighboring candidate subregion into the predicted text line.

5. The method according to claim 4, wherein:

the text feature information comprises text confidence information; and using each predicated subregion as the current candidate subregion comprises:

obtaining, by the computer device, text confidence information corresponding to each predicated subregion, and performing, by the computer device, non-maximum suppression on each predicated subregion according to the text confidence information, to obtain a predicated subregion whose text confidence is greater than a preset text confidence threshold as the current candidate subregion.

6. The method according to claim 1, wherein after connecting the predicated subregion into the predicted text line according to the text feature information of the predicated subregion by using the text clustering algorithm, the method further comprises:

obtaining, by the computer device, a predicted horizontal direction offset corresponding to each predicted text line; and correcting, by the computer device, a horizontal boundary of the predicted text line according to the predicted horizontal direction offset.

7. The method according to claim 1, wherein before obtaining the image, the method further comprises:

obtaining, by the computer device, training data comprising a set of sample images comprising a preset size proportion;

performing, by the computer device, feature extraction on the set of sample images, and inputting into the neural network, the neural network being obtained by initializing the neural network by using a Gaussian distribution random number with a preset average value and variance;

obtaining, by the computer device, a feature matrix outputted by the neural network, and mapping the feature matrix to a sample subregion by using the fully connected layer, to obtain the sample subregion;

obtaining, by the computer device, text feature information corresponding to each sample subregion, and obtaining the predicted text line according to the text feature information corresponding to each sample subregion by using the text clustering algorithm; and performing, by the computer device, optimization training by repeating a step of obtaining training data, according to a preset potential energy item and a preset weight attenuation value, to obtain a target text detection model according to a target optimization function.

8. A computer device, comprising a memory and a processor in communication with the memory, the memory storing an instruction, wherein, the instruction, when executed by the processor, is configured to cause the processor to perform:

obtaining an image;

inputting the image into a neural network to obtain a target feature matrix by:

performing feature extraction on the image, to obtain a first feature matrix, an element in the first feature matrix comprising a two-dimensional element, inputting the first feature matrix into a two-way long short-term memory (LSTM) network, to obtain a forward feature matrix and a backward feature matrix, and splicing the forward feature matrix and the backward feature matrix to obtain the target feature matrix;

inputting the target feature matrix into a fully connected layer to map each element of the target feature matrix to a predicated subregion according to a preset anchor;

obtaining text feature information of the predicated subregion;

connecting the predicated subregion into a predicted text line according to the text feature information of the predicated subregion by using a text clustering algorithm; and determining a text area corresponding to the image based on the predicted text line.

9. The computer device according to claim 8, wherein, when the instruction is configured to cause the processor to perform inputting the first feature matrix into the two-way LSTM network, to obtain a forward feature matrix and a backward feature matrix, the instruction is configured to cause the processor to perform:

obtaining a current location of a sliding-window matrix, and calculating a current convolution result of the sliding-window matrix and the first feature matrix according to the current location, the sliding-window matrix comprising a forward sliding-window matrix and a backward sliding-window matrix;

obtaining a current internal status value of the two-way LSTM network corresponding to the current location of the sliding-window matrix by using an activation function based on the current convolution result and a previous internal status value of the two-way LSTM network corresponding to a previous location of the sliding-window matrix;

sliding the sliding-window matrix to obtain a next location, and setting the next location as the current location, and repeating an operation of obtaining the current location of the sliding-window matrix, until the sliding-window matrix traverses elements of the first feature matrix; and processing internal status values of the two-way LSTM network corresponding to different locations of the sliding-window matrix, to generate a current feature matrix comprising the forward feature matrix and the backward feature matrix.

10. The computer device according to claim 8, wherein:

a width value of the preset anchor comprises a fixed value; and when the instruction is configured to cause the processor to perform obtaining the text feature information of the predicated subregion, the instruction is configured to cause the processor to perform:

obtaining a horizontal location of the predicated subregion according to the width value of the preset anchor and a first dimensional coordinate corresponding to each element of the target feature matrix, obtaining a vertical-direction predicted offset of the predicated subregion, calculating according to the vertical-direction predicted offset, a height value of the preset anchor, and a central coordinate value component, to respectively obtain a predicted height value corresponding to the predicated subregion and a central-point vertical-direction actual offset, and determining the text location information of the predicated subregion according to the horizontal location, the predicted height value, and the central-point vertical-direction actual offset.

11. The computer device according to claim 8, wherein:

the text feature information comprises text location information; and when the instruction is configured to cause the processor to perform connecting the predicated subregion into the predicted text line according to the text feature information of the predicated subregion by using a preset text clustering algorithm, the instruction is configured to cause the processor to perform:

using each predicated subregion as a current candidate subregion, to obtain first text location information corresponding to the current candidate subregion, obtaining, according to the first text location information, a target candidate subregion with a distance less than a preset distance threshold from the current candidate subregion and with a vertical-direction overlap degree greater than a preset overlap degree threshold, and using the target candidate subregion closest to the current candidate subregion as a neighboring candidate subregion, obtaining a next candidate subregion corresponding to the current candidate subregion as a current candidate subregion, and repeating a step of obtaining first text location information corresponding to the current candidate subregion, until candidate subregions are traversed, and connecting a candidate subregion and corresponding neighboring candidate subregion into the predicted text line.

12. The computer device according to claim 8, wherein before obtaining the image, the instruction is configured to cause the processor to perform:

obtaining training data, the training data comprising a set of sample images comprising a preset size proportion;

performing feature extraction on the set of sample images, and inputting into the neural network, the neural network being obtained by initializing the neural network by using a Gaussian distribution random number with a preset average value and variance;

obtaining a feature matrix outputted by the neural network, and mapping the feature matrix to a sample subregion by using the fully connected layer, to obtain the sample subregion;

obtaining text feature information corresponding to each sample subregion, and obtaining the predicted text line according to the text feature information corresponding to each sample subregion by using the preset text clustering algorithm; and performing optimization training by repeating a step of obtaining training data, according to a preset potential energy item and a preset weight attenuation value, to obtain a target text detection model according to a target optimization function.

13. A non-transitory computer readable storage medium storing instructions, wherein the instructions, when executed by a processor, are configured to cause the processor to:

obtain an image;

input the image into a neural network to obtain a target feature matrix by:

perform feature extraction on the image, to obtain a first feature matrix, an element in the first feature matrix comprising a two-dimensional element, input the first feature matrix into a two-way long short-term memory (LSTM) network, to obtain a forward feature matrix and a backward feature matrix, and splice the forward feature matrix and the backward feature matrix to obtain the target feature matrix;

input the target feature matrix into a fully connected layer to map each element of the target feature matrix to a predicted subregion according to a preset anchor;

obtain text feature information of the predicted subregion;

connect the predicated subregion into a predicted text line according to the text feature information of the predicated subregion by using a text clustering algorithm; and determine a text area corresponding to the image based on the predicted text line.

14. The non-transitory computer storage medium according to claim 13, wherein, when the instructions are configured to cause the processor to input the first feature matrix into the two-way LSTM network, to obtain a forward feature matrix and a backward feature matrix, the instructions are configured to cause the processor to:

obtain a current location of a sliding-window matrix, and calculate a current convolution result of the sliding-window matrix and the first feature matrix according to the current location, the sliding-window matrix comprising a forward sliding-window matrix and a backward sliding-window matrix;

obtain a current internal status value of the two-way LSTM network corresponding to the current location of the sliding-window matrix by using an activation function based on the current convolution result and a previous internal status value of the two-way LSTM network corresponding to a previous location of the sliding-window matrix;

slide the sliding-window matrix to obtain a next location, and set the next location as the current location, and repeat an operation to obtain the current location of the sliding-window matrix, until the sliding-window matrix traverses elements of the first feature matrix; and process internal status values of the two-way LSTM network corresponding to different locations of the sliding-window matrix, to generate a current feature matrix comprising the forward feature matrix and the backward feature matrix.

15. The non-transitory computer storage medium according to claim 13, wherein:

a width value of the preset anchor comprises a fixed value; and when the instructions are configured to cause the processor to obtain the text feature information of the predicated subregion, the instructions are configured to cause the processor to:

obtain a horizontal location of the predicated subregion according to the width value of the preset anchor and a first dimensional coordinate corresponding to each element of the target feature matrix, obtain a vertical-direction predicted offset of the predicated subregion, calculate according to the vertical-direction predicted offset, a height value of the preset anchor, and a central coordinate value component, to respectively obtain a predicted height value corresponding to the predicated subregion and a central-point vertical-direction actual offset, and determine the text location information of the predicated subregion according to the horizontal location, the predicted height value, and the central-point vertical-direction actual offset.

16. The non-transitory computer storage medium according to claim 13, wherein:

the text feature information comprises text location information; and when the instructions are configured to cause the processor to connect the predicated subregion into the predicted text line according to the text feature information of the predicated subregion by using a preset text clustering algorithm, the instructions are configured to cause the processor to:

use each predicated subregion as a current candidate subregion, to obtain first text location information corresponding to the current candidate subregion, obtain, according to the first text location information, a target candidate subregion with a distance less than a preset distance threshold from the current candidate subregion and with a vertical-direction overlap degree greater than a preset overlap degree threshold, and use the target candidate subregion closest to the current candidate subregion as a neighboring candidate subregion, obtain a next candidate subregion corresponding to the current candidate subregion as a current candidate subregion, and repeat a step to obtain first text location information corresponding to the current candidate subregion, until candidate subregions are traversed, and connect a candidate subregion and corresponding neighboring candidate subregion into the predicted text line.

17. The non-transitory computer storage medium according to claim 13, wherein, before the instructions are configured to cause the processor to obtain the image, the instructions are configured to cause the processor to:

obtain training data, the training data comprising a set of sample images comprising a preset size proportion;

perform feature extraction on the set of sample images, and input into the neural network, the neural network being obtained by initializing the neural network by using a Gaussian distribution random number with a preset average value and variance;

obtain a feature matrix outputted by the neural network, and map the feature matrix to a sample subregion by using the fully connected layer, to obtain the sample subregion;

obtain text feature information corresponding to each sample subregion, and obtain the predicted text line according to the text feature information corresponding to each sample subregion by using the preset text clustering algorithm; and perform optimization training by repeating a step to obtain training data, according to a preset potential energy item and a preset weight attenuation value, to obtain a target text detection model according to a target optimization function.

* * * * *